(12) United States Patent
Wong et al.

(10) Patent No.: US 11,500,164 B2
(45) Date of Patent: *Nov. 15, 2022

(54) LC TYPE CONNECTOR WITH PUSH/PULL ASSEMBLY FOR RELEASING CONNECTOR FROM A RECEPTACLE USING A CABLE BOOT

(71) Applicant: Senko Advanced Components, Inc., Marlborough, MA (US)

(72) Inventors: Kim Man Wong, Kowloon (HK); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,517

(22) Filed: Jan. 13, 2021

(65) Prior Publication Data
US 2021/0132302 A1  May 6, 2021

Related U.S. Application Data

(63) Continuation of application No. 16/569,624, filed on Sep. 12, 2019, now Pat. No. 10,921,531, which is a continuation-in-part of application No. 16/539,854, filed on Aug. 13, 2019, now Pat. No. 11,073,664, which is a continuation-in-part of application No. 16/199,139, filed on Nov. 24, 2018, now Pat. No. 11,086,087.

(60) Provisional application No. 62/730,373, filed on Sep. 12, 2018.

(51) Int. Cl.
*G02B 6/38* (2006.01)
*H01R 13/627* (2006.01)
*H01R 24/64* (2011.01)

(52) U.S. Cl.
CPC ......... *G02B 6/3893* (2013.01); *G02B 6/3879* (2013.01); *G02B 6/3887* (2013.01); *G02B 6/3897* (2013.01); *H01R 13/6272* (2013.01); *H01R 24/64* (2013.01)

(58) Field of Classification Search
CPC .................................................. G02B 6/3879
See application file for complete search history.

(56) References Cited

U.S. PATENT DOCUMENTS

| | | |
|---|---|---|
| 585,194 A | 6/1897 | Favor |
| 678,283 A | 7/1901 | Schaefer |
| 3,721,945 A | 3/1973 | Hults |
| 4,150,790 A | 4/1979 | Potter |
| 4,240,695 A | 12/1980 | Evans |

(Continued)

FOREIGN PATENT DOCUMENTS

| | | |
|---|---|---|
| CN | 2836038 Y | 11/2006 |
| CN | 201383588 Y | 1/2010 |

(Continued)

OTHER PUBLICATIONS

International Search Report and Written Opinion, Application No. PCT/US2019/039729 dated Dec. 13, 2019, pp. 27.

(Continued)

*Primary Examiner* — Sung H Pak

(57) ABSTRACT

A LC type connector assembly with a push/pull cable boot integrally formed with a protrusion that accepts an adapter release for releasing a fiber optic connector from an adapter port.

27 Claims, 20 Drawing Sheets

(56) References Cited

U.S. PATENT DOCUMENTS

| | | |
|---|---|---|
| 4,327,964 A | 5/1982 | Haesly |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,026,138 A | 6/1991 | Boudreau et al. |
| 5,031,981 A | 7/1991 | Peterson |
| 5,041,025 A | 8/1991 | Haitmanek |
| 5,073,045 A | 12/1991 | Abendschein |
| D323,143 S | 1/1992 | Ohkura et al. |
| 5,101,463 A | 3/1992 | Cubukciyan et al. |
| 5,146,813 A | 9/1992 | Stanfill, Jr. |
| 5,159,652 A | 10/1992 | Grassin DAlphonse et al. |
| 5,265,181 A | 11/1993 | Chang |
| 5,289,554 A | 2/1994 | Cubukciyan et al. |
| 5,315,679 A | 5/1994 | Baldwin et al. |
| 5,317,663 A | 5/1994 | Beard et al. |
| 5,321,784 A | 6/1994 | Cubukciyan et al. |
| 5,335,301 A | 8/1994 | Newman et al. |
| 5,348,487 A | 9/1994 | Marazzi et al. |
| 5,418,875 A | 5/1995 | Nakano et al. |
| 5,444,806 A | 8/1995 | de Marchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,602,951 A | 2/1997 | Shiota et al. |
| 5,684,903 A | 11/1997 | Kyomasu et al. |
| 5,687,268 A | 11/1997 | Stephenson et al. |
| 5,781,681 A | 7/1998 | Manning |
| 5,845,036 A | 12/1998 | De Marchi |
| 5,862,282 A | 1/1999 | Matsuura et al. |
| 5,915,987 A | 6/1999 | Reed et al. |
| 5,930,426 A | 7/1999 | Harting et al. |
| 5,937,130 A | 8/1999 | Amberg et al. |
| 5,953,473 A | 9/1999 | Shimotsu et al. |
| 5,956,444 A | 9/1999 | Duda et al. |
| 5,971,626 A | 10/1999 | Knodell et al. |
| 6,017,153 A | 1/2000 | Carlisle et al. |
| 6,041,155 A | 3/2000 | Anderson et al. |
| 6,049,040 A | 4/2000 | Biles et al. |
| 6,095,862 A | 8/2000 | Doye et al. |
| 6,134,370 A | 10/2000 | Childers et al. |
| 6,174,190 B1 | 1/2001 | Tharp et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,240,228 B1 | 5/2001 | Chen et al. |
| 6,247,849 B1 | 6/2001 | Liu |
| 6,250,817 B1 | 6/2001 | Lampert et al. |
| 6,276,840 B1 | 8/2001 | Weiss et al. |
| 6,318,903 B1 | 11/2001 | Andrews et al. |
| 6,364,537 B1 | 4/2002 | Maynard |
| 6,379,052 B1 | 4/2002 | de Jong et al. |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy et al. |
| 6,478,472 B1 | 11/2002 | Anderson et al. |
| 6,485,194 B1 | 11/2002 | Shirakawa |
| 6,527,450 B1 | 3/2003 | Miyachi et al. |
| 6,530,696 B1 | 3/2003 | Ueda et al. |
| 6,551,117 B2 | 4/2003 | Poplawski et al. |
| 6,565,262 B2 | 5/2003 | Childers et al. |
| 6,572,276 B1 | 6/2003 | Theis et al. |
| 6,579,014 B2 | 6/2003 | Melton et al. |
| 6,585,194 B1 | 7/2003 | Brushwood |
| 6,634,796 B2 | 10/2003 | de Jong et al. |
| 6,634,801 B1 | 10/2003 | Waldron et al. |
| 6,648,520 B2 | 11/2003 | McDonald et al. |
| 6,668,113 B2 | 12/2003 | Togami et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,783,280 B2 | 8/2004 | Viklund |
| 6,817,272 B2 | 11/2004 | Holland |
| 6,854,894 B1 | 2/2005 | Yunker et al. |
| 6,863,556 B2 | 3/2005 | Viklund et al. |
| 6,869,227 B2 | 3/2005 | Del Grosso et al. |
| 6,872,039 B2 | 3/2005 | Baus et al. |
| 6,935,789 B2 | 8/2005 | Gross, III et al. |
| 7,036,993 B2 | 5/2006 | Luther et al. |
| 7,052,186 B1 | 5/2006 | Bates |
| 7,077,576 B2 | 7/2006 | Luther et al. |
| 7,091,421 B2 | 8/2006 | Kukita et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| D543,124 S | 5/2007 | Raatikainen |
| D543,146 S | 5/2007 | Chen et al. |
| 7,234,879 B2 | 6/2007 | Schrodinger |
| 7,258,493 B2 | 8/2007 | Milette |
| 7,264,402 B2 | 9/2007 | Theuerkorn et al. |
| 7,281,859 B2 | 10/2007 | Mudd et al. |
| 7,297,013 B2 | 11/2007 | Caveney et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant et al. |
| 7,510,335 B1 | 3/2009 | Su et al. |
| 7,513,695 B1 | 4/2009 | Lin et al. |
| 7,534,128 B2 | 5/2009 | Caveney et al. |
| 7,540,666 B2 | 6/2009 | Luther et al. |
| 7,588,373 B1 | 9/2009 | Sato et al. |
| 7,591,595 B2 | 9/2009 | Lu et al. |
| 7,594,766 B1 | 9/2009 | Sasser et al. |
| 7,641,398 B2 | 1/2010 | ORiorden et al. |
| 7,695,199 B2 | 4/2010 | Teo et al. |
| 7,712,970 B1 | 5/2010 | Lee |
| 7,717,625 B2 | 5/2010 | Margolin et al. |
| 7,824,113 B2 | 11/2010 | Wong et al. |
| 7,837,395 B2 | 11/2010 | Lin et al. |
| 7,959,455 B1 | 6/2011 | Armstrong et al. |
| D641,708 S | 7/2011 | Yamauchi |
| 8,083,450 B1 | 12/2011 | Smith et al. |
| 8,152,385 B2 | 4/2012 | de Jong et al. |
| 8,186,890 B2 | 5/2012 | Lu |
| 8,192,091 B2 | 6/2012 | Hsu et al. |
| 8,202,009 B2 | 6/2012 | Lin et al. |
| 8,221,007 B2 | 7/2012 | Peterhans et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,414,196 B2 | 4/2013 | Lu et al. |
| 8,465,317 B2 * | 6/2013 | Gniadek ............ H01R 13/6335 439/352 |
| 8,534,928 B2 | 9/2013 | Cooke et al. |
| 8,550,728 B2 | 10/2013 | Takahashi et al. |
| 8,556,645 B2 | 10/2013 | Crain |
| 8,559,781 B2 | 10/2013 | Childers et al. |
| 8,622,634 B2 | 1/2014 | Arnold et al. |
| 8,636,424 B2 | 1/2014 | Kuffel et al. |
| 8,651,749 B2 | 2/2014 | Dainese J nior et al. |
| 8,676,022 B2 | 3/2014 | Jones |

(56) References Cited

U.S. PATENT DOCUMENTS

| | | |
|---|---|---|
| 8,678,670 B2 | 3/2014 | Takahashi et al. |
| 8,727,638 B2 | 5/2014 | Lee et al. |
| 8,757,894 B2 | 6/2014 | Katoh |
| 8,764,308 B2 | 7/2014 | Irwin et al. |
| 8,770,863 B2 | 7/2014 | Cooke et al. |
| 8,864,390 B2 | 10/2014 | Chen et al. |
| 8,869,661 B2 | 10/2014 | Opstad |
| 9,052,474 B2 | 6/2015 | Jiang et al. |
| 9,063,296 B2 | 6/2015 | Dong et al. |
| 9,250,402 B2 | 2/2016 | Ishii et al. |
| 9,310,569 B2 | 4/2016 | Lee |
| 9,366,829 B2 | 6/2016 | Czosnowski et al. |
| 9,411,110 B2 | 8/2016 | Barnette, Jr. et al. |
| 9,448,370 B2 | 9/2016 | Xue et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven et al. |
| 9,568,686 B2 | 2/2017 | Fewkes et al. |
| 9,581,768 B1 | 2/2017 | Baca et al. |
| 9,595,786 B1 | 3/2017 | Takano et al. |
| 9,599,778 B2 | 3/2017 | Wong et al. |
| 9,658,409 B2 | 5/2017 | Gniadek et al. |
| 9,678,283 B1 | 6/2017 | Chang et al. |
| 9,684,130 B2 | 6/2017 | Veatch et al. |
| 9,684,313 B2 | 6/2017 | Chajec |
| 9,709,753 B1 | 7/2017 | Chang et al. |
| 9,739,955 B2 | 8/2017 | Lee |
| 9,778,425 B2 | 10/2017 | Nguyen et al. |
| 9,829,645 B2 | 11/2017 | Good et al. |
| 9,829,653 B1 | 11/2017 | Nishiguchi et al. |
| 9,869,825 B2 | 1/2018 | Bailey et al. |
| 9,880,361 B2 | 1/2018 | Childers et al. |
| 9,946,035 B2 | 4/2018 | Gustafson et al. |
| 9,971,102 B2 | 5/2018 | Raven et al. |
| 9,989,711 B2 | 6/2018 | Ott et al. |
| 10,031,296 B2 | 7/2018 | Good |
| 10,067,301 B2 | 9/2018 | Murray et al. |
| 10,107,972 B1 | 10/2018 | Gniadek |
| 10,114,180 B2 | 10/2018 | Suzic |
| 10,120,140 B2 | 11/2018 | Goldstein et al. |
| 10,146,011 B2 | 12/2018 | Nhep |
| 10,295,758 B2 | 5/2019 | Chen |
| 10,921,531 B2 * | 2/2021 | Wong .................... H01R 24/64 |
| 11,086,087 B2 * | 8/2021 | Wong .................... G02B 6/3869 |
| 2002/0168148 A1 | 11/2002 | Gilliland et al. |
| 2002/0191919 A1 | 12/2002 | Nolan |
| 2003/0053787 A1 | 3/2003 | Lee |
| 2003/0063862 A1 | 4/2003 | Fillion et al. |
| 2003/0091925 A1 | 5/2003 | Cheng |
| 2003/0157825 A1 | 8/2003 | Kane |
| 2004/0052473 A1 | 3/2004 | Seo et al. |
| 2004/0109646 A1 | 6/2004 | Anderson et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2004/0247252 A1 | 12/2004 | Ehrenreich et al. |
| 2005/0036744 A1 | 2/2005 | Caveney et al. |
| 2005/0111796 A1 | 5/2005 | Matasek et al. |
| 2005/0213891 A1 | 9/2005 | Hardcastle et al. |
| 2006/0013539 A1 | 1/2006 | Thaler et al. |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki et al. |
| 2006/0160429 A1 | 7/2006 | Dawiedczyk et al. |
| 2006/0191356 A1 | 8/2006 | Chikaraishi |
| 2006/0193562 A1 | 8/2006 | Theuerkorn |
| 2006/0274411 A1 | 12/2006 | Yamauchi |
| 2007/0025665 A1 | 2/2007 | Dean et al. |
| 2007/0028409 A1 | 2/2007 | Yamada |
| 2007/0079854 A1 | 4/2007 | You |
| 2007/0098329 A1 | 5/2007 | Shimoji et al. |
| 2007/0149028 A1 | 6/2007 | Yu et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0056647 A1 | 3/2008 | Margolin et al. |
| 2008/0064334 A1 | 3/2008 | Hamadi et al. |
| 2008/0226237 A1 | 9/2008 | ORiorden et al. |
| 2009/0022457 A1 | 1/2009 | de Jong et al. |
| 2009/0028507 A1 | 1/2009 | Jones et al. |
| 2009/0047818 A1 | 2/2009 | Irwin et al. |
| 2009/0176401 A1 | 7/2009 | Gu |
| 2009/0196555 A1 | 8/2009 | Lin et al. |
| 2009/0214162 A1 | 8/2009 | ORiorden et al. |
| 2009/0290938 A1 | 11/2009 | Asaoka et al. |
| 2010/0054668 A1 | 3/2010 | Nelson |
| 2010/0061069 A1 | 3/2010 | Cole |
| 2010/0092136 A1 | 4/2010 | Nhep |
| 2010/0220961 A1 | 9/2010 | de Jong et al. |
| 2010/0247041 A1 | 9/2010 | Szilagyi |
| 2010/0284656 A1 | 11/2010 | Morra et al. |
| 2011/0044588 A1 | 2/2011 | Larson et al. |
| 2011/0058773 A1 | 3/2011 | Peterhans et al. |
| 2011/0131801 A1 | 6/2011 | Nelson et al. |
| 2011/0155810 A1 | 6/2011 | Taniguchi et al. |
| 2011/0177710 A1 | 7/2011 | Tobey |
| 2011/0239220 A1 | 9/2011 | Gibson et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2012/0308183 A1 | 12/2012 | Irwin et al. |
| 2012/0328248 A1 | 12/2012 | Larson et al. |
| 2013/0019423 A1 | 1/2013 | Srutkowski |
| 2013/0071067 A1 | 3/2013 | Lin |
| 2013/0094816 A1 | 4/2013 | Lin et al. |
| 2013/0101258 A1 | 4/2013 | Hikosaka et al. |
| 2013/0121653 A1 | 5/2013 | Shitama et al. |
| 2013/0163934 A1 | 6/2013 | Lee et al. |
| 2013/0170797 A1 | 7/2013 | Ott |
| 2013/0183012 A1 | 7/2013 | Cabanne Lopez et al. |
| 2013/0216185 A1 | 8/2013 | Klavuhn et al. |
| 2013/0308915 A1 | 11/2013 | Buff et al. |
| 2014/0016901 A1 | 1/2014 | Lambourn et al. |
| 2014/0050446 A1 | 2/2014 | Chang |
| 2014/0056562 A1 | 2/2014 | Limbert et al. |
| 2014/0133808 A1 | 5/2014 | Hill et al. |
| 2014/0169727 A1 | 6/2014 | Veatch et al. |
| 2014/0219621 A1 | 8/2014 | Barnette, Jr. et al. |
| 2014/0226946 A1 | 8/2014 | Cooke et al. |
| 2014/0241644 A1 | 8/2014 | Kang et al. |
| 2014/0241678 A1 | 8/2014 | Bringuier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0003788 A1 | 1/2015 | Chen et al. |
| 2015/0111417 A1 | 4/2015 | Vanderwoud |
| 2015/0177463 A1 | 6/2015 | Lee et al. |
| 2015/0198766 A1 | 7/2015 | Takahashi et al. |
| 2015/0212282 A1 | 7/2015 | Lin |
| 2015/0227059 A1 | 8/2015 | Lu et al. |
| 2015/0241644 A1 | 8/2015 | Lee |
| 2015/0301294 A1 | 10/2015 | Chang et al. |
| 2015/0331201 A1 | 11/2015 | Takano et al. |
| 2015/0355417 A1 | 12/2015 | Takano et al. |
| 2015/0370021 A1 | 12/2015 | Chan |
| 2016/0047993 A1 | 2/2016 | Hioki et al. |
| 2016/0131849 A1 | 5/2016 | Takano et al. |
| 2016/0139343 A1 | 5/2016 | Dean, Jr. et al. |
| 2016/0161681 A1 | 6/2016 | Banal, Jr. et al. |
| 2016/0169727 A1 | 6/2016 | Riedel et al. |
| 2016/0172852 A1 | 6/2016 | Tamura et al. |
| 2016/0216458 A1 | 7/2016 | Shih |
| 2016/0216958 A1 | 7/2016 | Kurian et al. |
| 2016/0231512 A1 | 8/2016 | Seki |
| 2016/0259135 A1 | 9/2016 | Gniadek et al. |

(56) References Cited

U.S. PATENT DOCUMENTS

| | | |
|---|---|---|
| 2016/0266326 A1 | 9/2016 | Gniadek |
| 2016/0320572 A1 | 11/2016 | Gniadek |
| 2016/0327756 A1 | 11/2016 | Raven et al. |
| 2016/0327757 A1 | 11/2016 | Lee |
| 2016/0349458 A1 | 12/2016 | Murray et al. |
| 2016/0370545 A1 | 12/2016 | Jiang et al. |
| 2017/0003458 A1 | 1/2017 | Gniadek |
| 2017/0205587 A1 | 7/2017 | Chang et al. |
| 2017/0205590 A1 | 7/2017 | Bailey et al. |
| 2017/0205591 A1 | 7/2017 | Takano et al. |
| 2017/0212313 A1 | 7/2017 | Elenabaas et al. |
| 2017/0212316 A1 | 7/2017 | Takano et al. |
| 2017/0254961 A1 | 9/2017 | Kamada et al. |
| 2017/0276275 A1 | 9/2017 | Beemer et al. |
| 2017/0276887 A1 | 9/2017 | Allen |
| 2017/0293090 A1 | 10/2017 | Hopper et al. |
| 2017/0343740 A1 | 11/2017 | Nguyen |
| 2018/0128988 A1 | 5/2018 | Chang et al. |
| 2018/0156988 A1 | 6/2018 | Gniadek et al. |
| 2018/0172923 A1 | 6/2018 | Bauco et al. |
| 2018/0232872 A1 | 8/2018 | Katsumata |
| 2018/0252872 A1 | 9/2018 | Chen |
| 2018/0341069 A1 | 11/2018 | Takano et al. |
| 2019/0204513 A1 | 7/2019 | Davidson et al. |
| 2020/0081201 A1 | 3/2020 | Wong et al. |

FOREIGN PATENT DOCUMENTS

| | | |
|---|---|---|
| CN | 102016670 A | 4/2011 |
| CN | 103529522 A | 1/2014 |
| DE | 19507669 A1 | 9/1996 |
| DE | 19507669 C2 | 10/1998 |
| DE | 202006011910 U1 | 3/2007 |
| DE | 102006019335 A1 | 10/2007 |
| DE | 202009019167 U1 | 6/2017 |
| EP | 1211537 A3 | 6/2002 |
| EP | 1245980 A | 10/2002 |
| EP | 1245980 A2 | 10/2002 |
| EP | 1916552 A1 | 4/2008 |
| EP | 1566674 B1 | 5/2009 |
| EP | 2274644 A1 | 1/2011 |
| EP | 2664951 A1 | 11/2013 |
| EP | 3101456 A1 | 12/2016 |
| GB | 2111240 B | 9/1985 |
| JP | 2000089059 A | 3/2000 |
| JP | 3752331 B2 | 3/2006 |
| JP | 2009229545 A | 10/2009 |
| JP | 2009276493 A | 11/2009 |
| JP | 4377820 B2 | 12/2009 |
| KR | 200905382 U | 6/2009 |
| KR | 101371686 B1 | 3/2014 |
| TW | 200821653 A | 5/2008 |
| WO | 2001019904 A1 | 3/2001 |
| WO | 2001079904 A3 | 3/2002 |
| WO | 2004027485 A1 | 4/2004 |
| WO | 2006007120 A1 | 1/2006 |
| WO | 2009135787 A1 | 11/2009 |
| WO | 2010024851 A3 | 6/2010 |
| WO | 2012136702 A1 | 10/2012 |
| WO | 2015103783 A1 | 7/2015 |
| WO | 2016019993 A1 | 2/2016 |
| WO | 2019126333 A1 | 6/2019 |

OTHER PUBLICATIONS

International Search Report, Application No. PCT/US2018/034658, dated Oct. 16, 2018 pp. 9.

International Search Report and Written Opinion, Application No. PCT/US19/46397, dated Nov. 12, 2019, pp. 6.

Fiber Optic Connectors and Assemblies Catalog, 2009, Huber & Suhner Fiber Optics, Herisau, Switzerland.

Fiber Optic Interconnect Solutions, Tactical Fiber Optic Connector Cables and Termini, 2006, Glenair, Inc., Glendale, California.

Fiber Optic Products Catalog, Nov. 2007, Tyco Electronics Corporation, Harrisburg, Pennsylvania.

Final Office Action, U.S. Appl. No. 16/035,691, dated Feb. 11, 2019, pp. 8.

Non-Final Office Action, U.S. Appl. No. 16/035,695, dated Sep. 28, 2018, pp. 7.

International Search Report and Written Opinion for Application No. PCT/US2018/62406 dated Mar. 18, 2019, 12, pages, United States.

International Search Report and Written Opinion for Application No. PCT/US2019/40700 dated Sep. 27, 2019, 12, pages, United States.

International Search Report and Written Opinion for Application No. PCT/US2019/50895 dated Jan. 6, 2020, 12, pages, United States.

International Search Report and Written Opinion for Application No. PCT/US2019/50909 dated Dec. 17, 2019, 11, pages, United States.

International Search Report and Written Opinion for Application No. PCT/US2019/56564 dated Jan. 14, 2020, 14, pages, United States.

International Search Report and Written Opinion, Application No. PCT/US2018/056133, dated Jan. 1, 2019, pp. 7.

International Search Report and Written Opinion, Application No. PCT/US/2018/042202, pp. 17, dated Dec. 7, 2018.

International Search Report and Written Opinion, Application No. PCT/US2018/62405, dated Apr. 3, 2019, pp. 17.

International Search Report and Written Opinion, Application No. PCT/US19/24718, dated Jun. 26, 2019, pp. 7.

International Search Report and Written opinion for Application No. PCT/US2019/013861, dated Apr. 8, 2019, 14 pages.

* cited by examiner

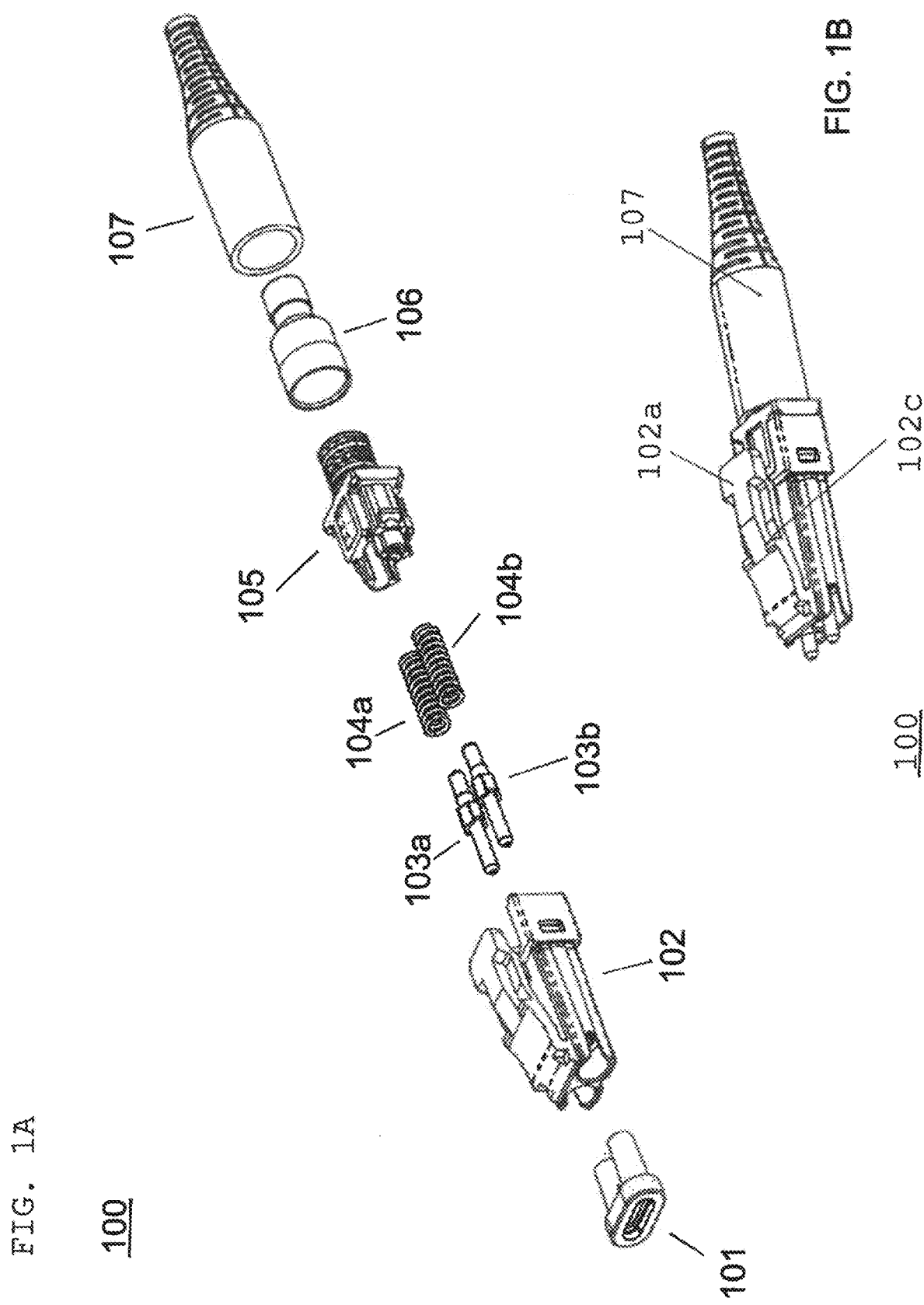

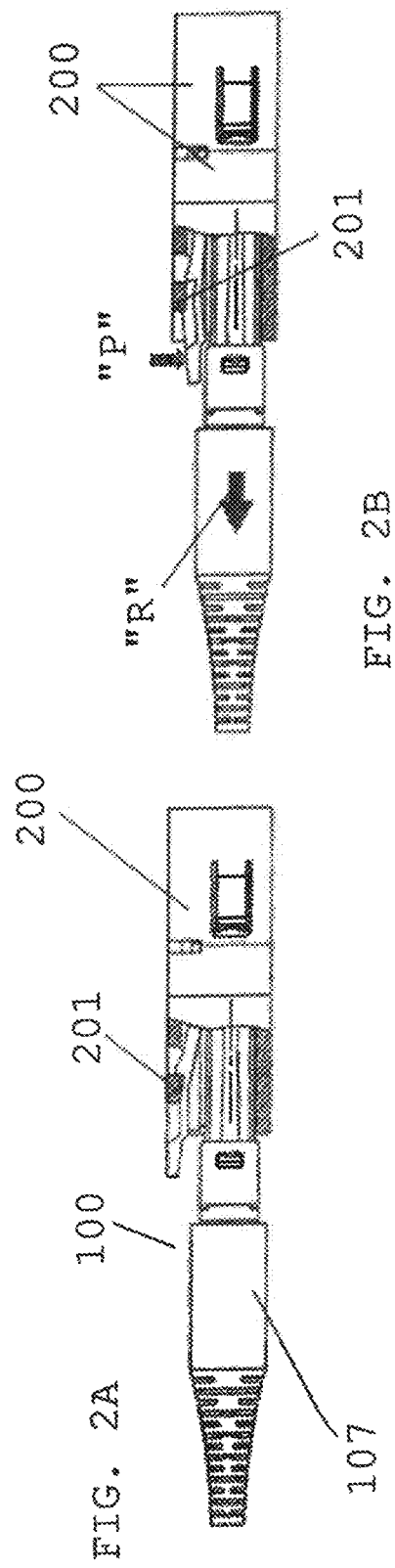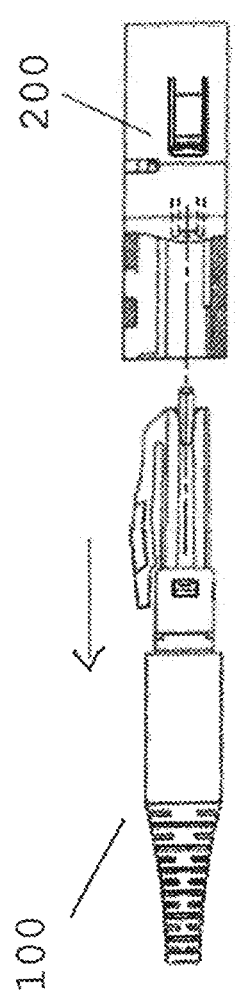

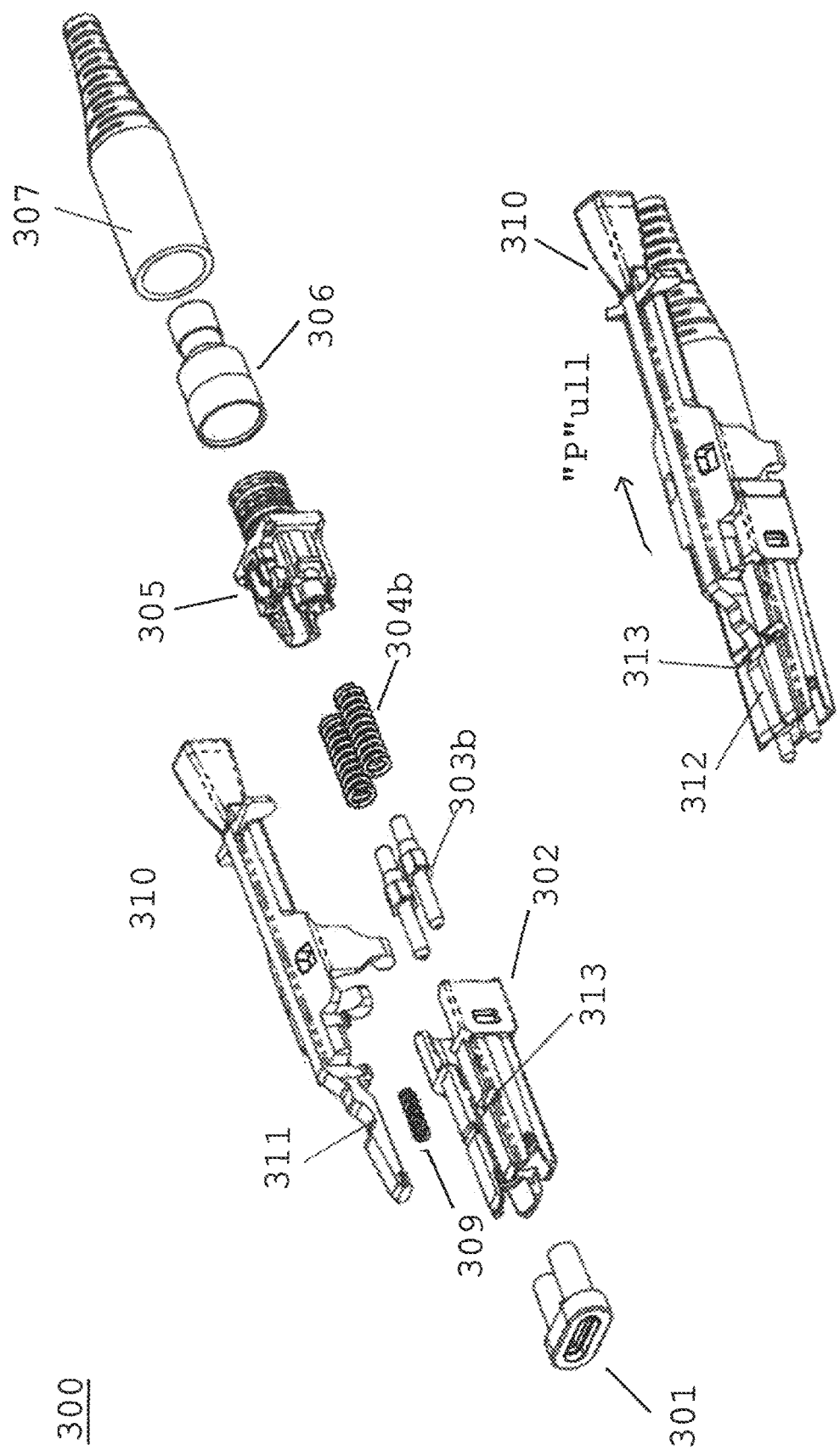

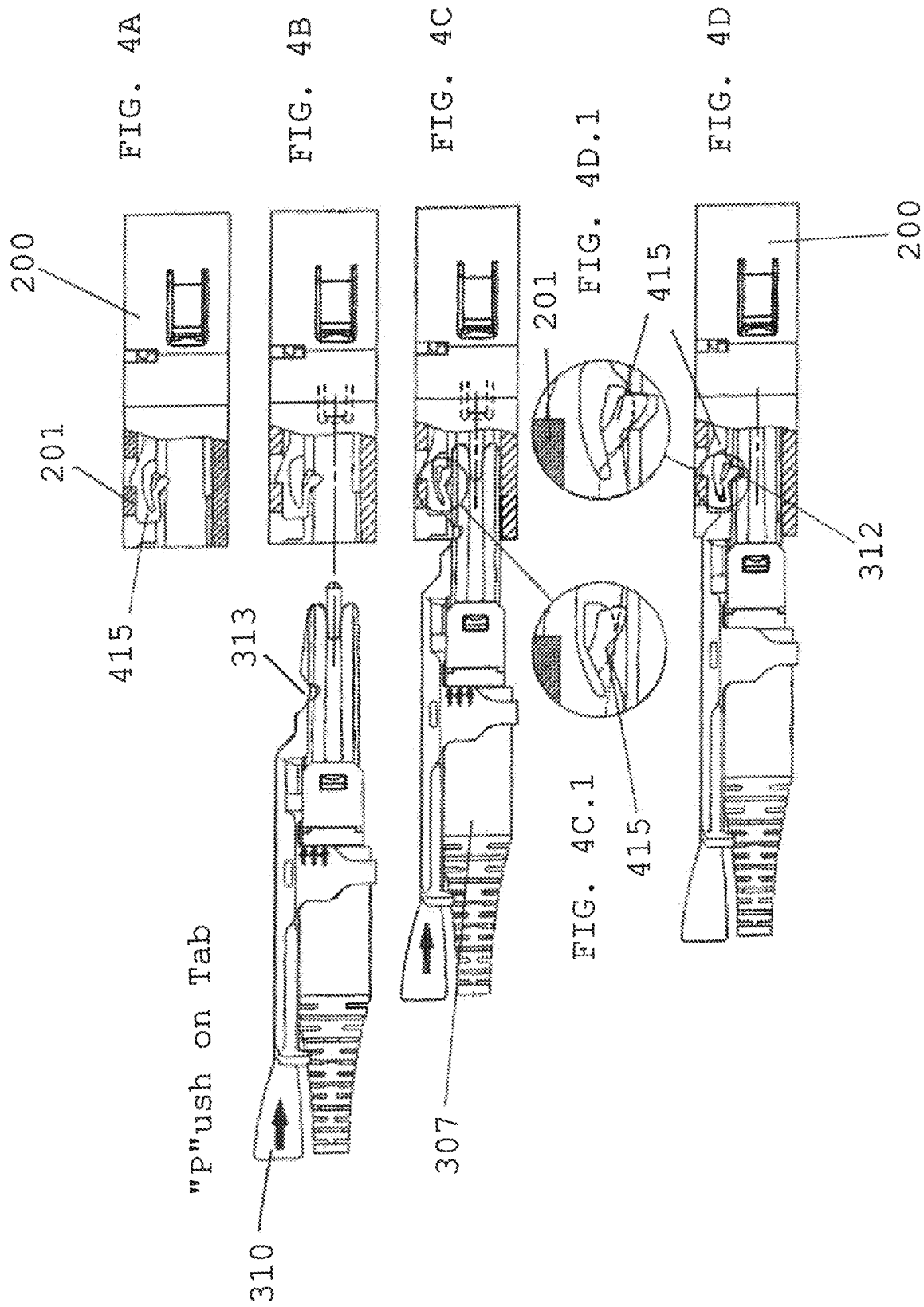

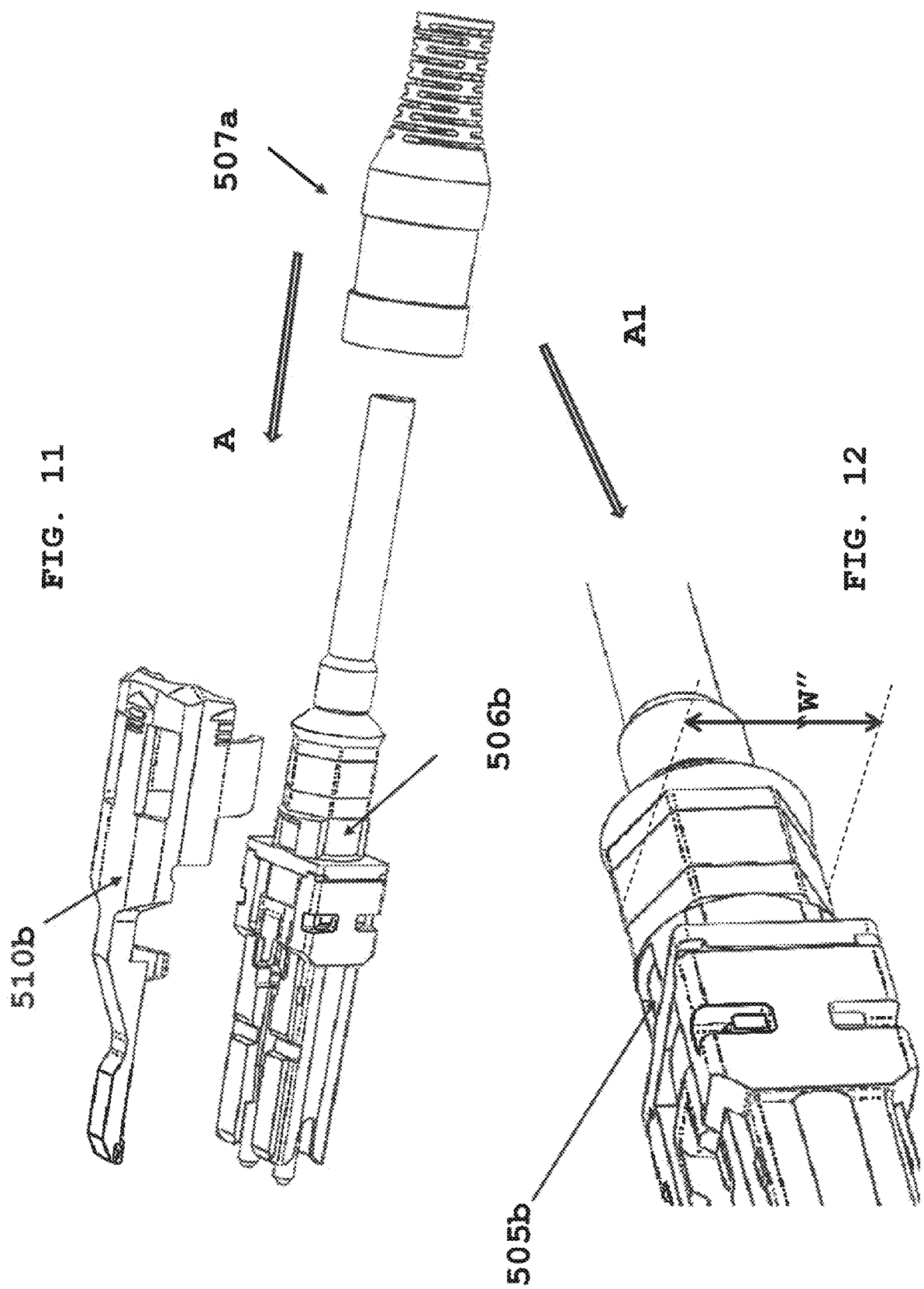

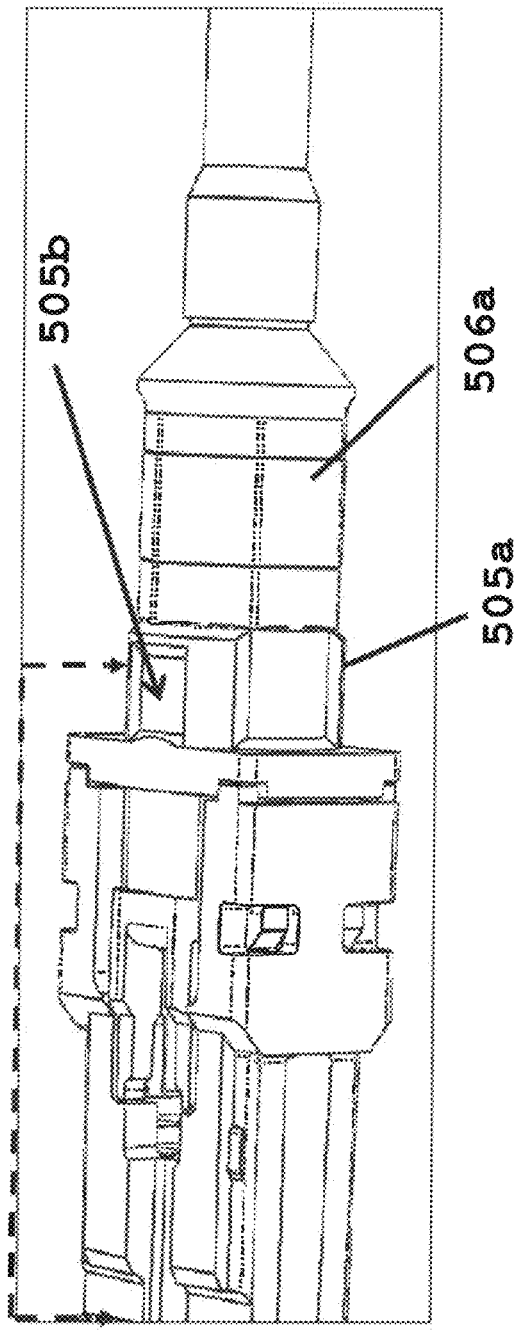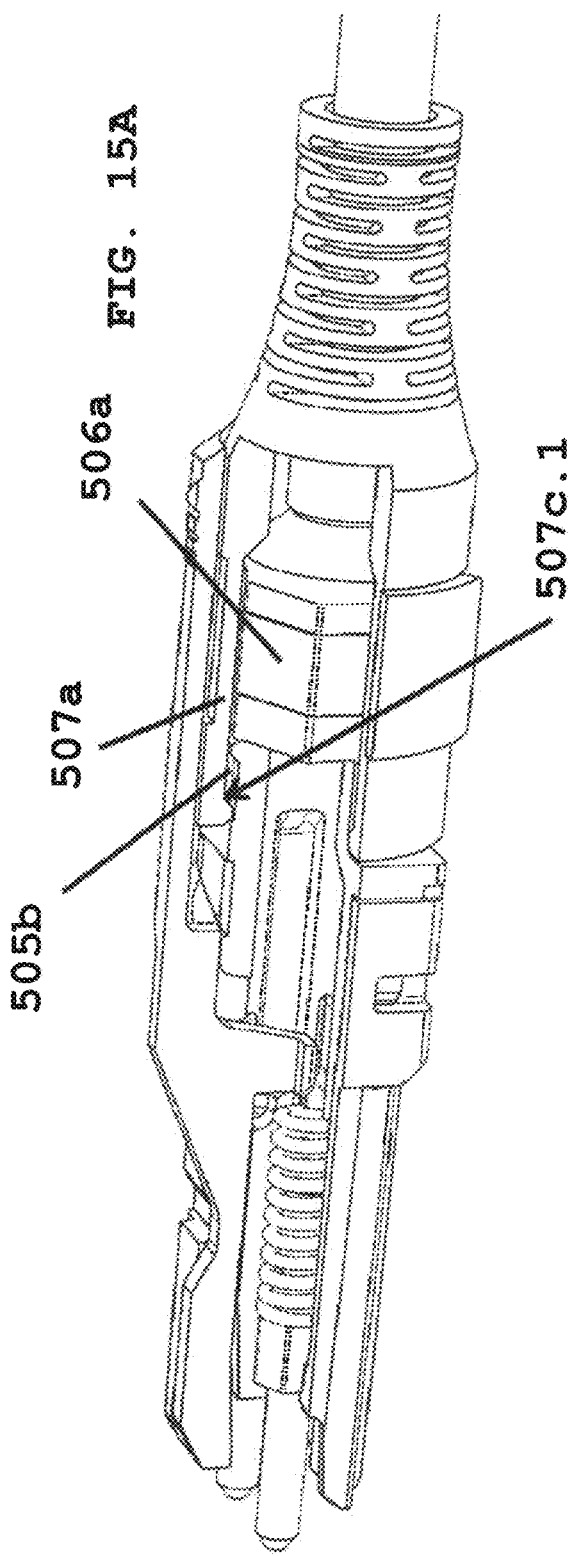

LC TYPE CONNECTOR WITH PUSH/PULL ASSEMBLY FOR RELEASING CONNECTOR FROM A RECEPTACLE USING A CABLE BOOT

CROSS-REFERENCE TO RELATED-APPLICATIONS

This application is a continuation of U.S. patent application Ser. No. 16/569,624 filed on Sep. 12, 2019, titled "LC TYPE CONNECTOR WITH PUSH/PULL ASSEMBLY FOR RELEASING CONNECTOR FROM A RECEPTACLE USING A CABLE BOOT", which claims priority to U.S. Provisional Application No. 62/730,373 filed on Sep. 12, 2018, entitled "LC Type Connector with Clip-on Push/Pull Tab for Releasing Connector from a Receptacle using Cable Boot", and is a continuation-in-part of U.S. patent application Ser. No. 16/199,139 filed on Nov. 24, 2018 title "LC Type Connector with Clip-on Push/Pull Tab for Releasing Connector from a Receptacle using Cable Boot", and is a continuation-in-part of U.S. patent application Ser. No. 16/539,854 filed Aug. 13, 2019, entitled "Cable Boot Assembly for Releasing Fiber Optic Connector from a Receptacle," each of which is incorporated herein by reference in its entirety.

BACKGROUND

The present disclosure relates generally to connectors deploying a release from a receptacle, and more specifically to narrow width adapters and connectors, such as narrow pitch distance Lucent Connector (LC) duplex adapters and narrow width multi-fiber connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to individual the release mechanism to remove a connector from a receptacle. Such physical obstructions may impede the ability of an operator to minimize the stresses applied to the cables and the connectors. For example, these stresses may be applied when a user reaches into a dense group of connectors and pushes aside surrounding optical fibers and connectors to access an individual connector release mechanism with his/her thumb and forefinger. The typical connector access point is nearer the connector body. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

In summary, one aspect provides a connector comprising: a front body comprising: a top and a bottom, a recess running lengthwise on the top of the front body, and a rear body detachably connected to the front body forming a housing, wherein a portion of the rear body fits inside the front body when detachably connected, a cable boot with a crimp ring at proximal end, and an outer body with a recess configured to accept a push/pull tab; and a push-pull tab comprising a front portion, a rear portion, and one or more side portions, wherein the push-pull tab is detachably connected to the housing using the one or more side portions and detachably connected to the cable boot recess, wherein the front portion sits in the recess. Upon pulling upon the cable or cable boot, the connector is unsecured or released from a receptacle or adapter inner latching structure, when the push/pull tab connected to the cable boot via at least one wing that is secured within a recess formed within the cable boot itself. The cable boot has at least on inner protrusions that is moveable, secured within a recess or cut-out in back body of connector. Movement by pulling rearward releases connector from receptacle port. The recess is sized and shaped to allow from connector release with cable boot inner protrusion.

Another aspect provides a receiver device comprising: one or more ports for receiving a connector having a top and a bottom; the one or more ports comprising at least one cutout on the top; and the one or more ports comprising at least one guide rail on the bottom, wherein the at least one cutout is configured to receive an interchangeable anchor device.

A further aspect provides a network system comprising: a connector comprising a housing comprising a groove running widthwise on a surface of the housing; and a push-pull tab comprising a complementary groove, wherein the push-pull tab is detachably connected to the housing; and a receiver device comprising one or more ports for receiving the connector, the one or more ports having an interchangeable anchor device including a first portion and a second portion; wherein the groove is configured to receive the first portion of the interchangeable anchor device when the connector is inserted into the receiving element, and wherein the complimentary groove is configured to receive the second portion of the interchangeable anchor device when the connector is inserted into the receiving element, the push-pull tab being configured to disengage the second portion of the interchangeable anchor device from the complementary groove when the push-pull tab is moved in a direction away from the connector, thereby disengaging the first portion of the interchangeable anchor device from the grove of the connector.

In the present invention, the push-pull tab 510a of FIG. 5 is used with a cable boot release 507a assembly for releasing and inserting a fiber optic connector from an adapter receptacle. This reduces overall space requirements as the push/pull tab extends from the connector body over a cable, and the push/pull tab protrudes into valuable space between racks of connectors interconnecting the network. In one embodiment, the cable boot assembly moves over a back post or back body located with a connector housing. The back body is secured to a front housing using a latch and recess mechanism.

This cable boot assembly can be used with a LC or Lucent @connector, a SC or standard connector, a CS® or SN™ connector sold by the assignee of the present invention, or a MT ferrule or mechanical transfer ferrule connector used in MPO or multi-fiber push on connector. All these connector types have a ferrule with an optical fiber secured therein at a proximal end, and an incoming cable at a distal end. Applicant pending application U.S. Ser. No. 15/881,309 filed on Jan. 26, 2018, titled "Modular Connector and Adapter Devices", Inventor is Takano, is fully incorporated by reference herein.

Accordingly, there is a need for fiber optic connectors that will meet the needs of future developments allowing for smaller footprints, easier implementation, and easy field modification.

BRIEF DESCRIPTION OF THE DRAWINGS

FIG. 1A is a perspective view of a prior art narrow pitch connector deploying a bend-latch release.

FIG. 1B is a perspective view of the bend latch connector of FIG. 1A assembled.

FIG. 2A is a perspective view of inserting the connector of FIG. 1A into a receptacle.

FIG. 2B is a perspective view of the connector of FIG. 1A at start of release from a receptacle.

FIG. 2C is a perspective view of the connector of FIG. 1A removed from a receptacle.

FIG. 3A is an exploded view of a prior art narrow pitch LC type connector.

FIG. 3B is an assembled view of FIG. 3A.

FIG. 4A is a perspective view of a receptacle with an anchor device within receptacle port.

FIG. 4B is a perspective view of FIG. 3B connector prior to insertion in receptacle of FIG. 4A.

FIG. 4C is a perspective view of FIG. 3B connector inserted into receptacle activating anchor device.

FIG. 4C.1 is a zoomed view of anchor device being lifted prior and secured in recess at front of connector of FIG. 3A.

FIG. 4D is a perspective view of FIG. 3B connector being removed from receptacle.

FIG. 4D.1 is a zoomed view of anchor device being lifted out of recess by pulling on push/pull tab.

FIG. 6A depicts is a perspective view of the push-pull tab pulled rearward of the connector assembly of FIG. 3B.

FIG. 7A depicts a further cross-section taken of FIG. 6A while connector is being removed from receptacle.

FIG. 8A depicts a side view of a connector assembly of FIG. 3A with anchor device fully removed from recess.

FIG. 11 is a partial exploded view of FIG. 9.

FIG. 12 is a side view of the connector crimp ring prior to securing cable boot.

FIG. 15 is a perspective view of connector body without push/pull tab.

FIG. 15A is a partial cross-section of push/pull tab and cable boot secured to connector body.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 6:
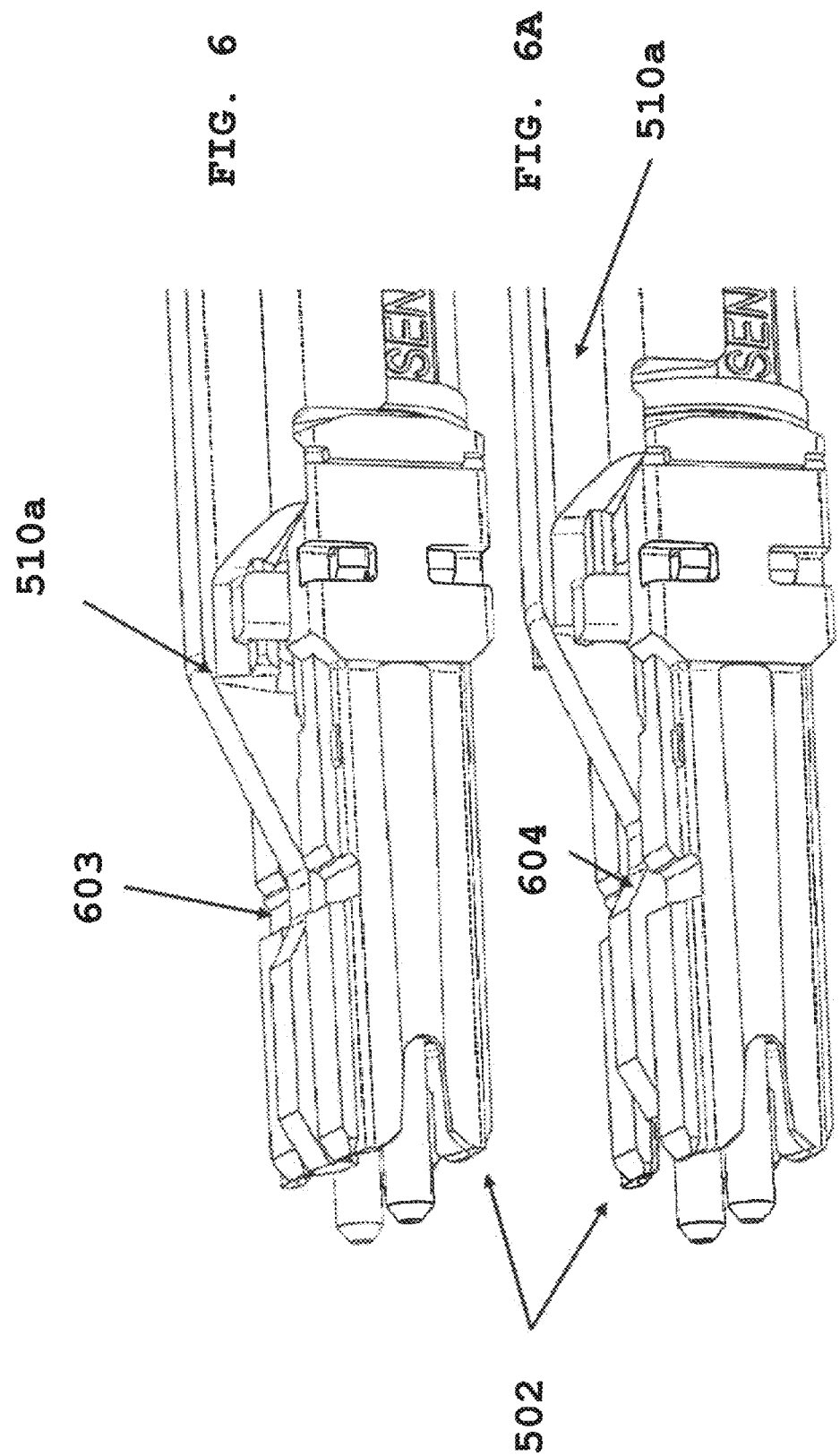
FIG. 6 depicts is a perspective view of a proximal end of a connector assembly of FIG. 3B.

FIG. 1A depicts a prior art bend latch connector. The connector 100 comprises a dust cap 101, front body 102, ferrule assembly (103a, 103b), ferrule bias springs (104a, 104b), a back body 105, crimp ring 106 and cable boot 107. FIG. 1B is FIG. 1A assembled. Bend latch 102a is depressed to release latch surface 102c secured within a receptacle (not shown). FIG. 2A depicts connector 100 secured within receptacle 200, with latch surface 102c secured behind cut out 201. FIG. 2B depicts removing connector 100 by depressing at "P" latch 102. FIG. 2C depicts pulling connector 100 rearward, in direction of arrow A, until the connector is removed from receptacle 200. To remove this connector, a user must depress the latch very close to the receptacle port. When there are connectors side-by-side, the user may depress a second connector latch or could loosen the second connector in a second port. This would result in signal loss. FIG. 3A depicts an exploded view of a LC type prior art connector with a push/pull tab. The push/pull tab 310 is secured about front body. A bias spring 309 maintains tab 310 in a forward position, as shown in FIG. 6. Ferrule 303b is biased forward by spring 304b, and the spring/ferrule are held within front body 305. Crimp ring 306 is secured to back body, and cable boot 037 is secured to crimp ring 306. FIG. 3B depicts assembled connector 300. A width-wise recess 313 receives an anchor device 715 secured within a receptacle 200, refer to FIG. 7 below, to secure connector 300 within receptacle 200. A ramp surface 312 lifts anchor device upward as push/pull tab 310 is pulled in direction of "P". FIG. 4A depicts receptacle 200 with an anchor device 415 secured behind receptacle cut out 201. FIG. 4B shows connector 300 being inserted using push/pull tab 310 into receptacle 200. FIG. 4C shows connector 300 with anchor device entering in width-wise recess. FIG. 4C.1 is a zoomed view of anchor device 415 being secured within width-wise recess on connector front body, as connector 300 is inserted into receptacle 200. FIG. 4D depicts anchor device 415 being lifted by ramp surface 312 of push/pull tab 301. FIG. 4D.1 is a zoomed view of anchor device being lifted out of width-wise recess by ramp surface 312 as connector 300 is removed by pulling rearward on push/pull tab 310.

Figure 5:
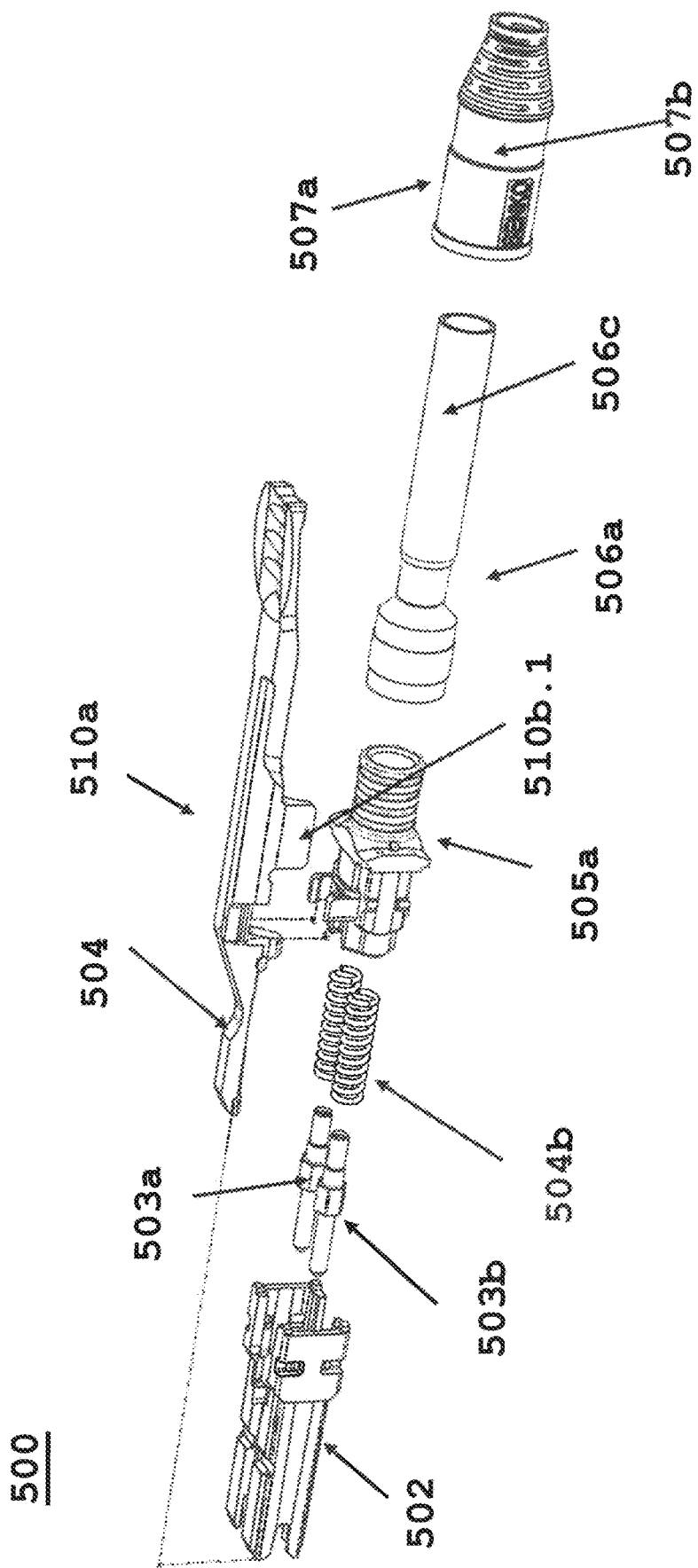
FIG. 5 depicts an exploded view of a connector assembly according to a first embodiment.

FIG. 5 depicts an exploded view of the present invention. Connector 500 comprises a front body 502 accepts ferrule 503b biased by spring 504b respectively, and held in place by back body 505a. Push/pull tab 510a attaches a proximal end of front body 502, is secured to back body 505a, and tab 510b.1 attaches about recess 507b of cable boot 507a. Cable boot 507a is secured about crimp ring 506a. Cable 506c jacket is secured and pressed with crimp ring 506a. Connector 500 is assembled from right to left. Ramp surface 504 lifts anchor device in recess 603 to release the connector from the receptacle port. FIG. 6A depicts a proximal end of connector 500 with push/pull tab 510a biased forward, and width-wise recess 603. FIG. 6B depicts connector 500 being pull rearward using push/pull tab 510a, where ramp surface 604 would lift an anchor device (not shown) within receptacle port.

Figure 7:
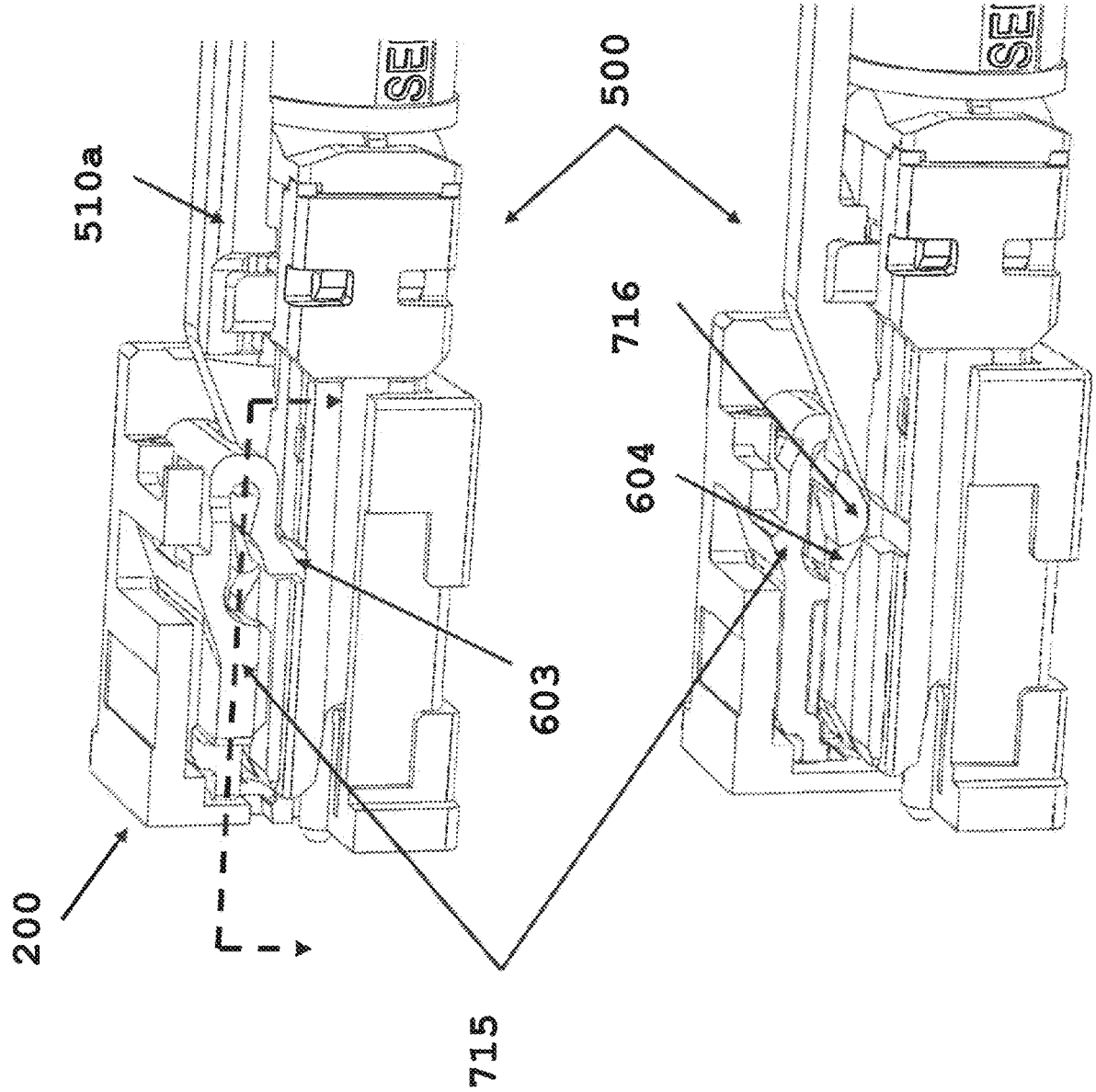
FIG. 7 depicts a cross-section view of a receptacle having the connector of FIG. 6 therein.
Figure 8:
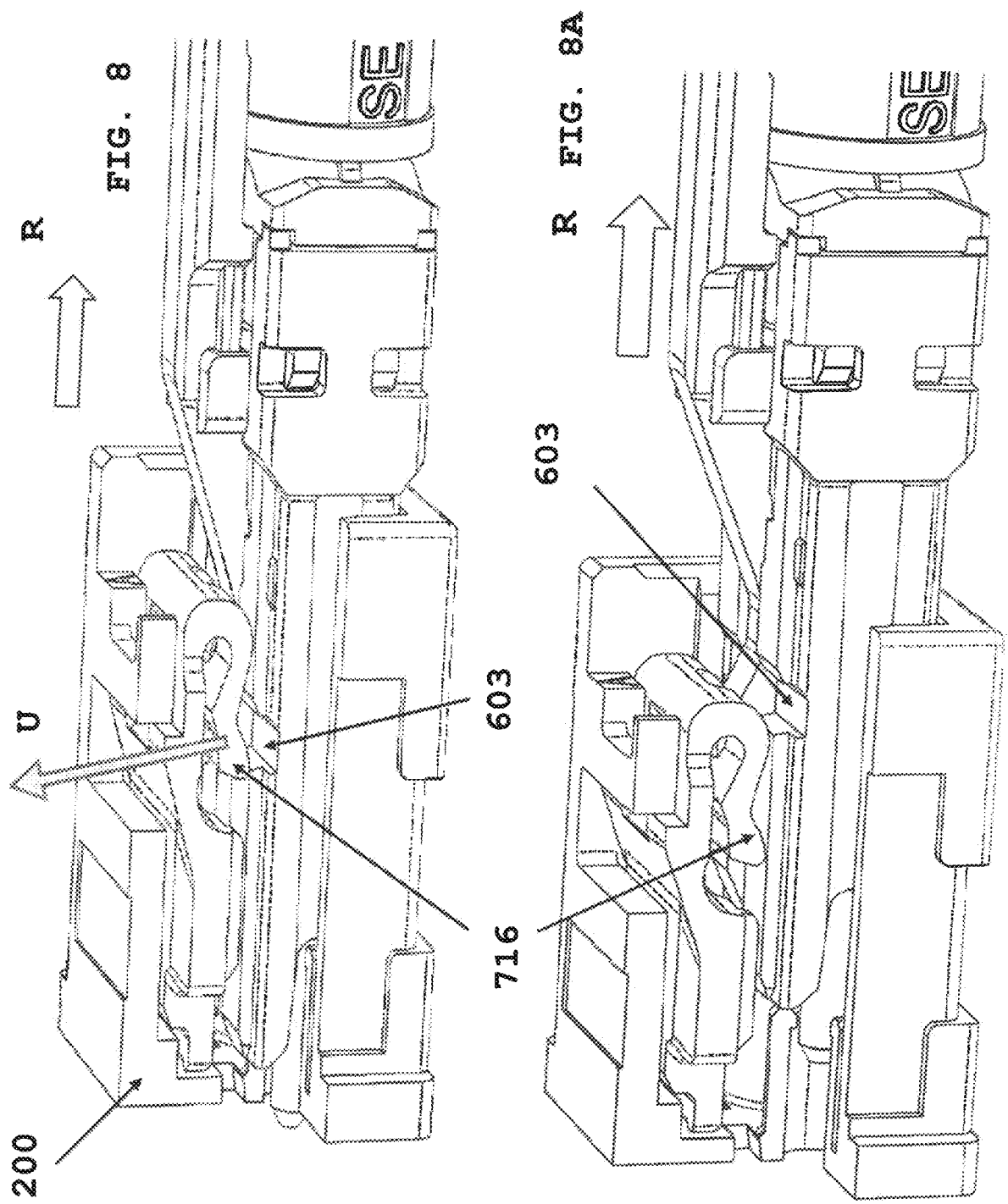
FIG. 8 depicts a view of anchor device being moved up and out of recess during removal of connector of FIG. 3A from receptacle.

FIG. 7 depicts anchor device 715 retained within recess 603 that secures connector 500 in receptacle 200 port. FIG. 7A depicts a cross-section of FIG. 7 showing anchor device leg 716 within recess 603, and up against ramp surface 604, which is integrated with push/pull tab 510a. FIG. 8 depicts removing in direction of arrow R connector 500 from receptacle 200. Anchor leg 716 is lifted up (in direction of arrow U) by ramp surface 604. FIG. 8A depicts further rearward removal of the connector from the receptacle, where the anchor leg 716 is out of recess 603, and now released from the receptacle port.

Figure 9:
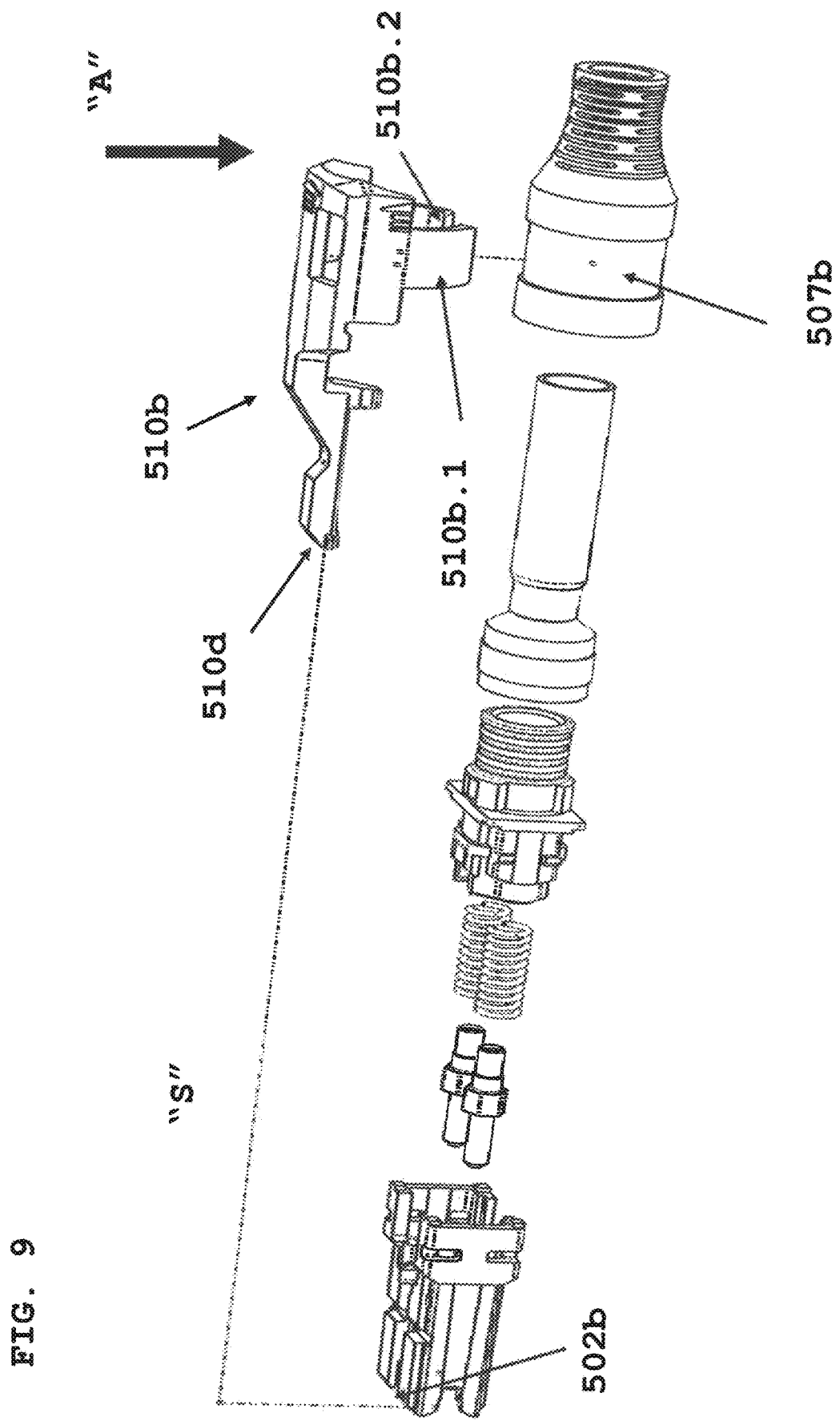
FIG. 9 is an exploded view of the present invention.
Figure 10:
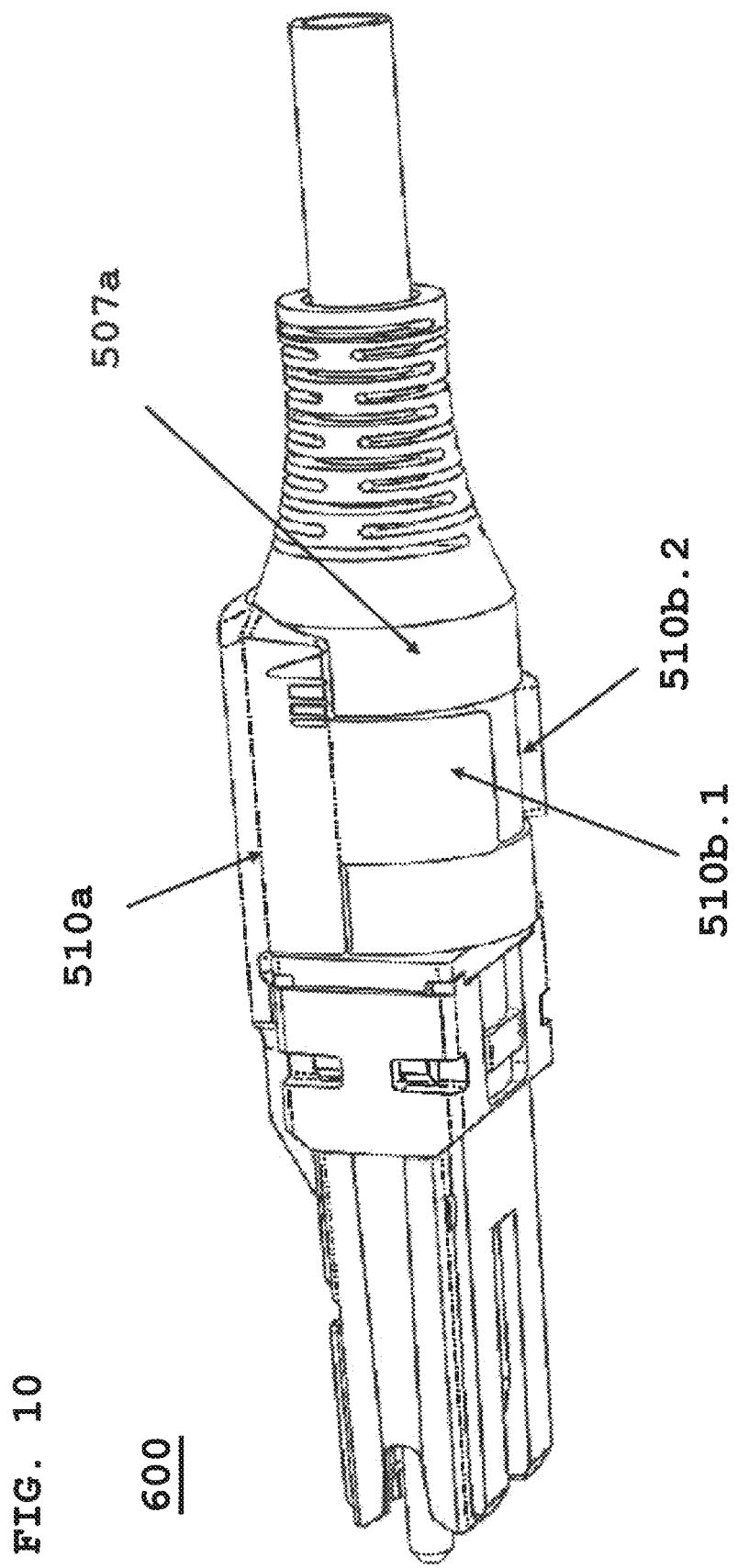
FIG. 10 is an assembled bottom view of the connector assembly of FIG. 9.

FIG. 9 is an exploded view of connector 500 prior to assembly of push/pull clip 510b, a second embodiment of the present invention. Proximal end 510d of clip 510b is secured to a proximal end 502b of front body, and wings 510b.1, 510b.2 are secured about circumferential recess 507b formed as part of the cable boot. Assembly is in direction of arrow "A" of push/pull clip 510b onto cable boot 507a. FIG. 10 depicts connector 600 with push/pull clip 510a assembled with wings (510b.1, 510b.2) secured about recess of cable boot 507a. FIG. 11 depicts an exploded view of securing cable boot 507a onto crimp sleeve 506b in direction of arrow "A". FIG. 12 depicts a zoomed view of crimp sleeve "W" width. Width "W" is the maximum outside dimension of crimp ring 506a over which cable boot 507a is placed. The inside dimension of cable boot 506a is sized to allow cable boot to be inserted over crimp ring sleeve 506b. This allows cable boot 507a to be secured onto back body 505a, using back body cut out 505b. Since back body 505a is secured to front body 502a, and push/pull clip 510a is secured about cable boot 506a, a rearward pulling on cable 506c or cable boot 507a will release connector (500, 600) from a receptacle port.

Figure 13:
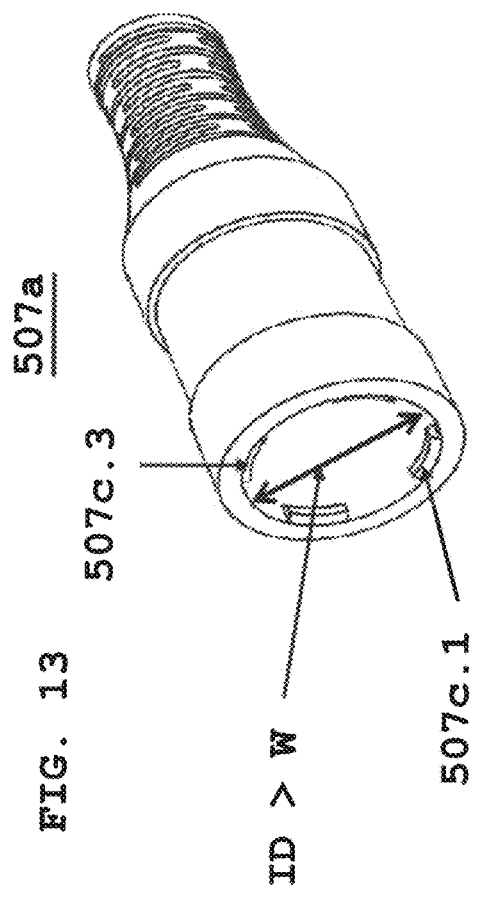
FIG. 13 is a front view of cable boot.
Figure 14:
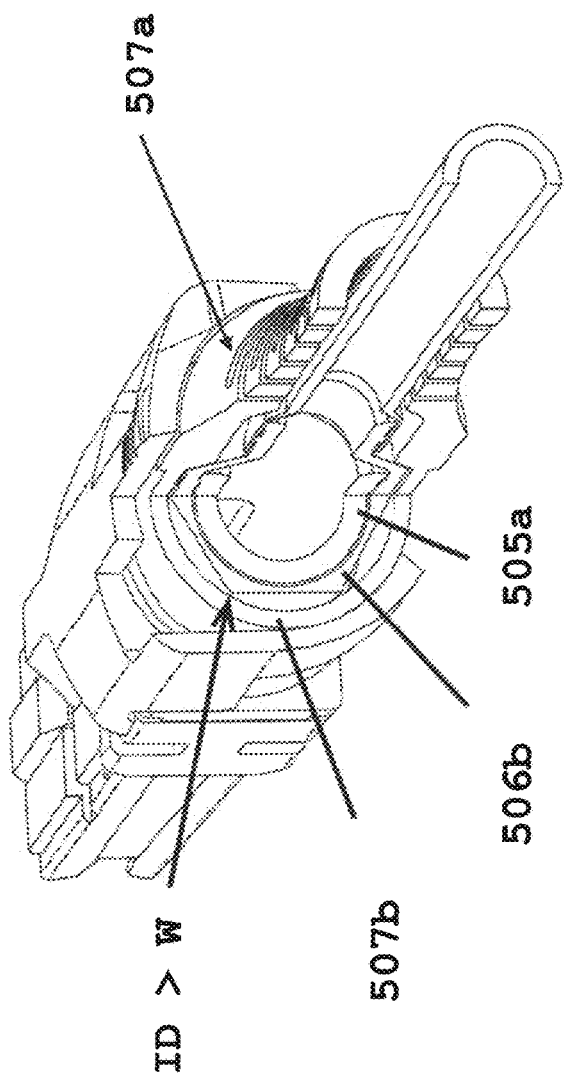
FIG. 14 is a cross-section of cable boot secured over rear of connector.

FIG. 13 depicts cable boot 507a. The inner diameter of cable boot at a proximal end opening, is slightly larger than the "W" of crimp ring sleeve 506b. Protrusions 507c.1 thru 507c.3, on an inside surface of cable boot. Cable boot 507a may have one or more protrusions that are secured within a corresponding cut out 505b on an outside surface of back body 505a. This secures and positions cable boot 507a over back body 505a. FIG. 14 is a cross-section cut-out of rear view of cable boot 507a secured over crimp ring sleeve 506b, and back body 505a is crimped over crimp ring. The cable boot is integrated with connector (550, 600), and by assembling the push/pull clip as shown in FIG. 10, a pull rearward on cable or cable boot will release connector from receptacle port.

Figure 16:
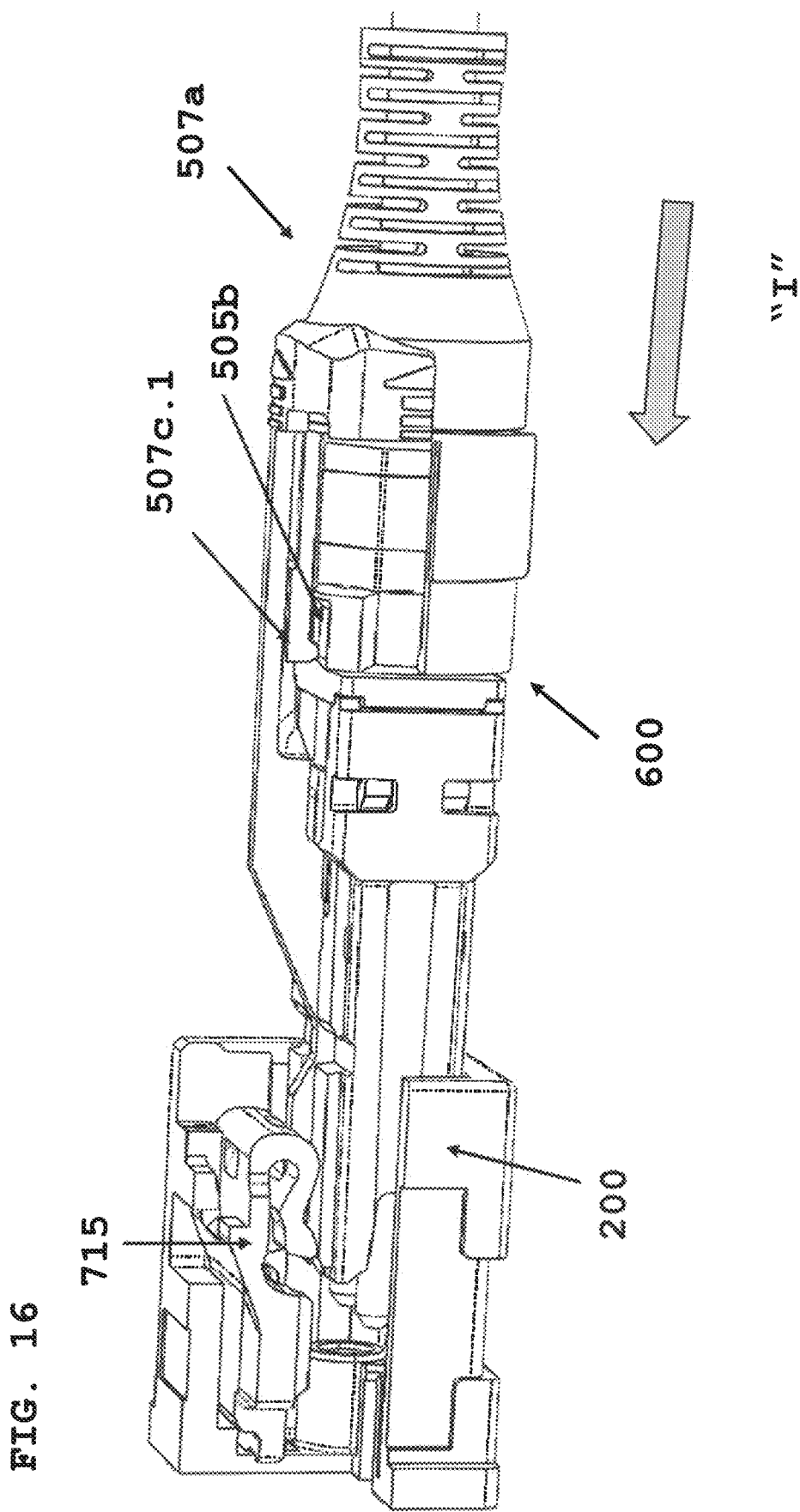
FIG. 16 depicts insertion of connector of FIG. 9 into a receptacle.
Figure 17:
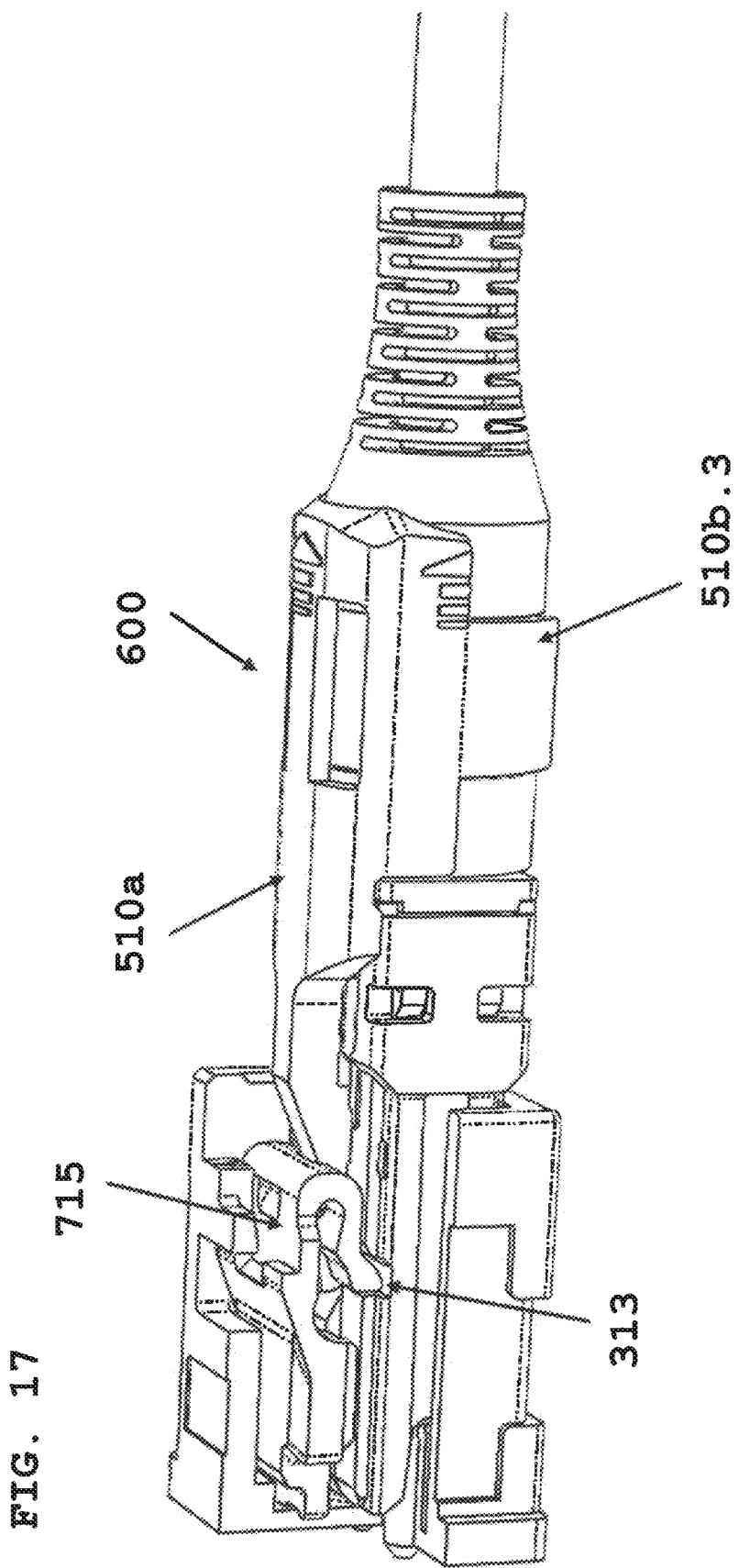
FIG. 17 depicts connector of FIG. 9 inserted into a receptacle.

FIG. 15 depicts back body 505a cut out 505b, with back body secured within crimp ring 506a. FIG. 15A is a cross-section cut-out of FIG. 15 (shown by dotted line), with cable boot protrusion 507c.1 (although more than one protrusion/back body cut out can be used), moveable within back body cut out 505b. Upon pulling cable or cable boot rearward, protrusion 507c.1 moves rearward along cut out. The distance moved allows push/pull clip ramp surface 604 to lift anchor device leg 716 from widthwise recess 603, which releases connector 500 from a receptacle port. FIG. 16 depicts connector 600 being inserted into receptacle 200 port in direction of arrow "I". Anchor device 715 is out of recess. The cable boot protrusions 507c.1 is fully forward in back body recess/cut-out 505b. FIG. 17 depicts connector 600 fully inserted into receptacle port, with anchor leg 715 within width-wise recess 313. Wing 5120b.3 permanently may secures push/pull clip 510a to cable boot 507a.

Figure 18:
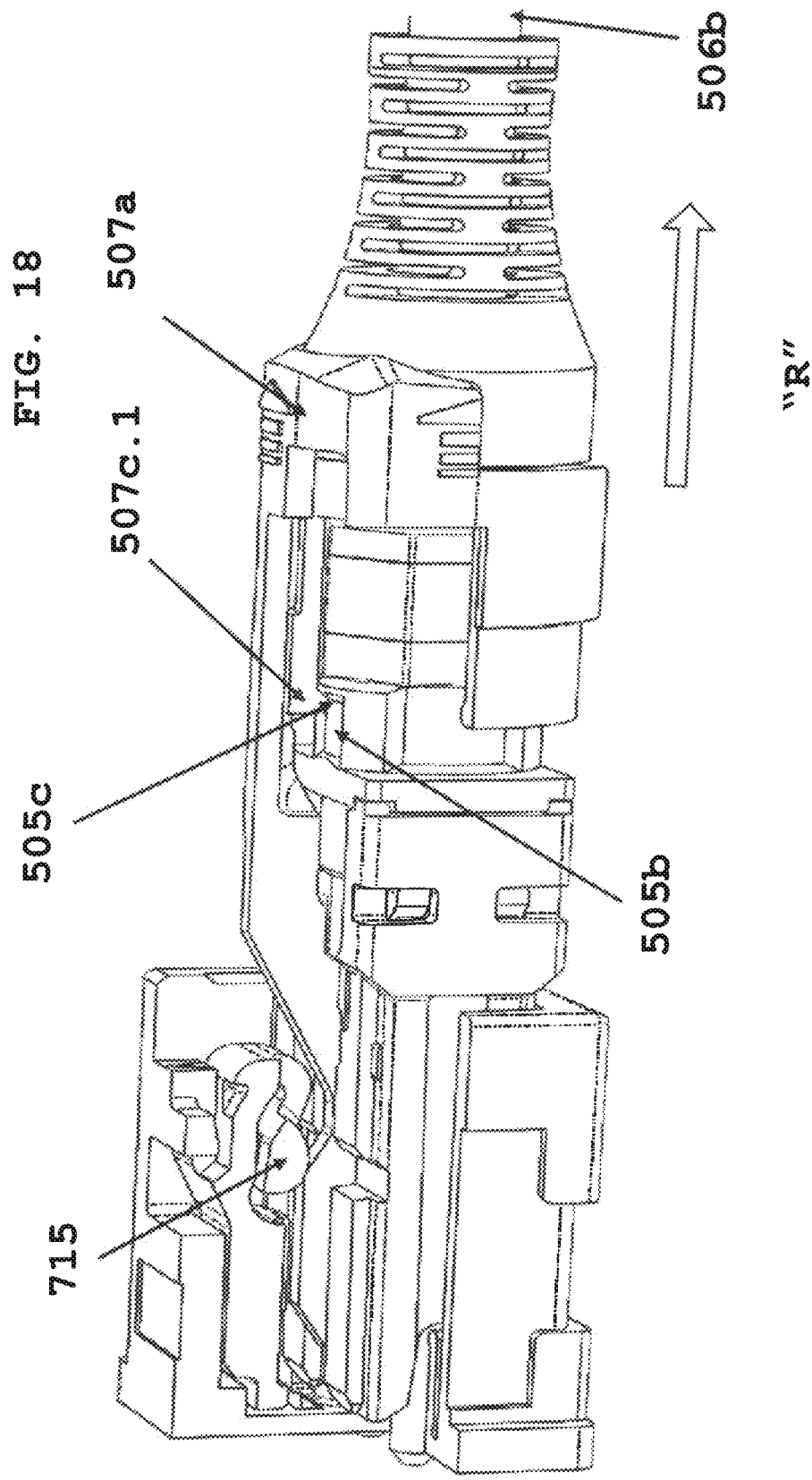
FIG. 18 depicts removal of connector of FIG. 9 from a receptacle.
Figure 19:
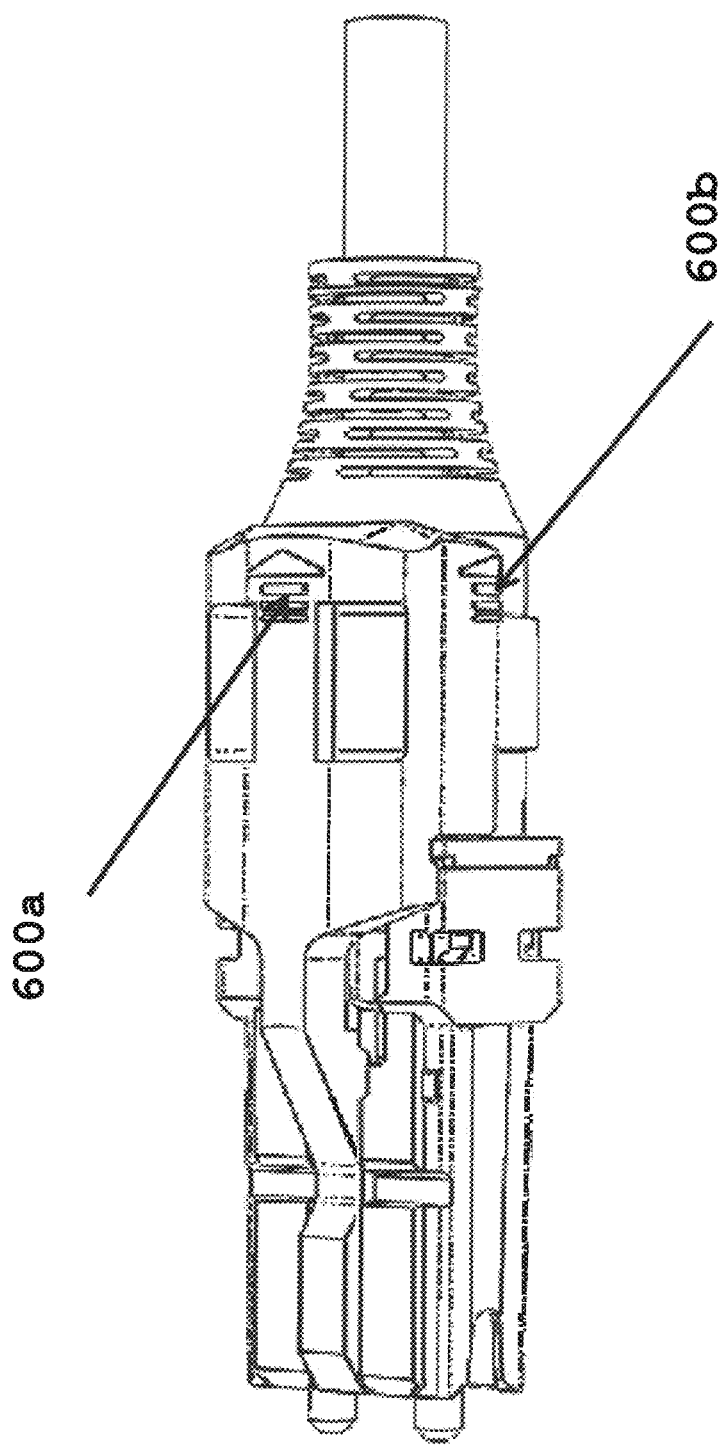
FIG. 19 depicts a raised surface to use to pull connector of FIG. 9 rearward.

FIG. 18 depicts connector (500, 600) being removed from receptacle port by a user pulling on cable boot 507a or cable 506c in direction of arrow "R". Protrusion 507c.1 moves rearward within back body cut-out/recess 505b, until protrusion is stopped by a recess stop face 505c. The length of recess 505b is sized to accommodate a protrusion 507c.1, and to allow ramp surface 604 to lift out anchor leg 517 from recess 503, and release connector (500, 600) from the receptacle port. FIG. 19 connector with a raised surface 600a or 600b to pull on to release connector.

Figure 20:
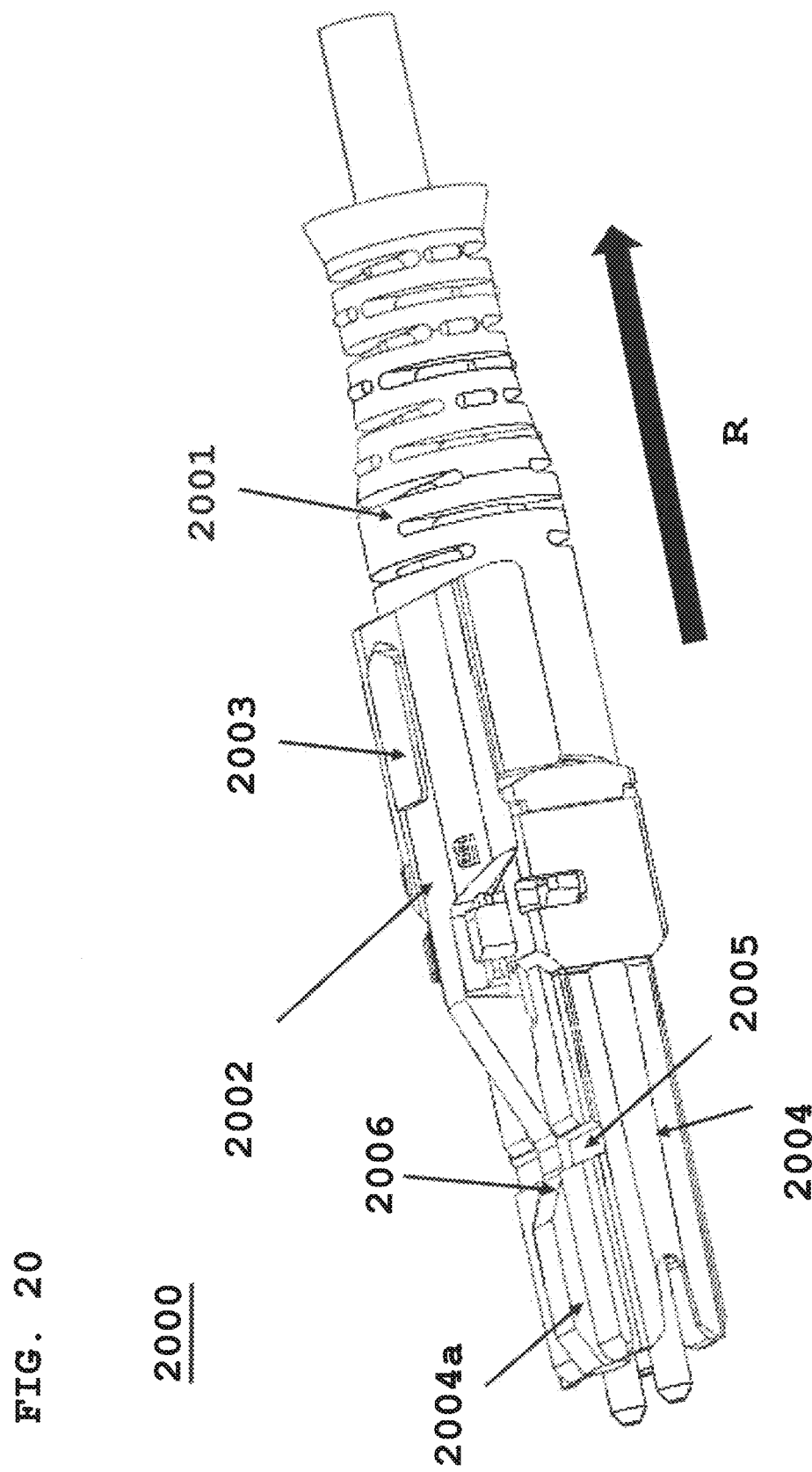
FIG. 20 depicts another fiber optic connector configured to be released from an adapter using a cable boot.

FIG. 20 depicts an assembled view of a fiber optic connector 2000 with cable boot 2001 configured to move the adapter release 2002, in a distal direction or direction of arrow "R", of connector 2000 from an adapter port (as described above in FIGS. 16-18). Connector housing has channel 2004a that accepts adapter release 2002. Connector 2000 has connector housing 2004 that accepts backbody 2007 (FIG. 22). Backbody 2007 is configured to retain adapter release 2002 (refer to FIG. 21). Adapter release 2002 has ramp 2006 that lifts hook or latch retained within recess 2005 when connector 2000 is inserted in an adapter port as shown above. In operation, cable boot 2001 has a protrusion 2003 that is retained within opening 2002a (FIG. 22) of adapter release 2002. Since backbody 2007 is attached to adapter release 2002 and connector housing 2004 and cable boot is secured to adapter release 2002, when pulling on the cable boot in direction "R", adapter release 2002 ramp 2006 causes the adapter hook to lift out of recess 2005 thereby releasing the connector 2000 from an adapter port.

Figure 21:
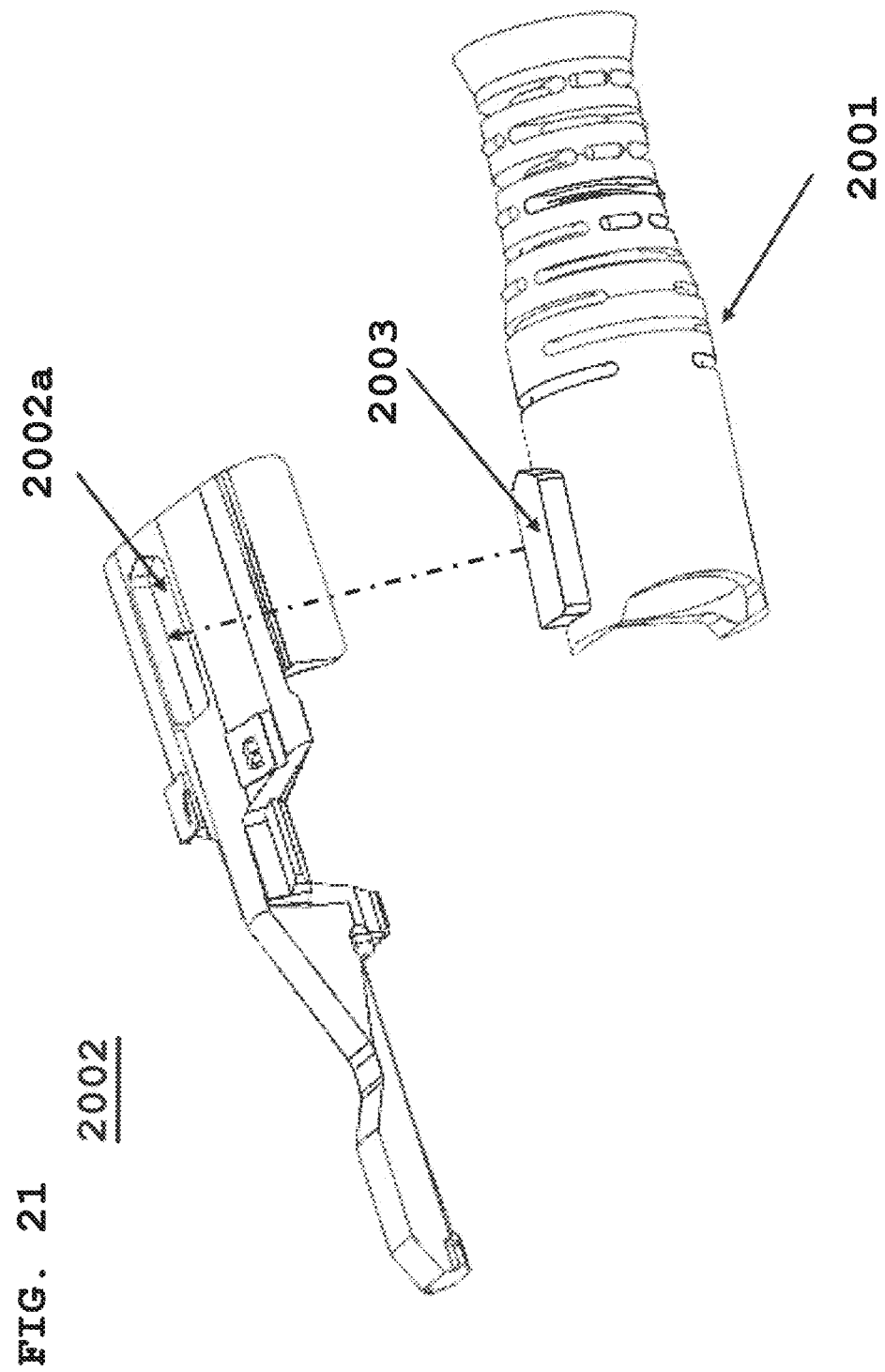
FIG. 21 depicts an exploded view of ramp release housing configured to accept the cable boot.
Figure 22:
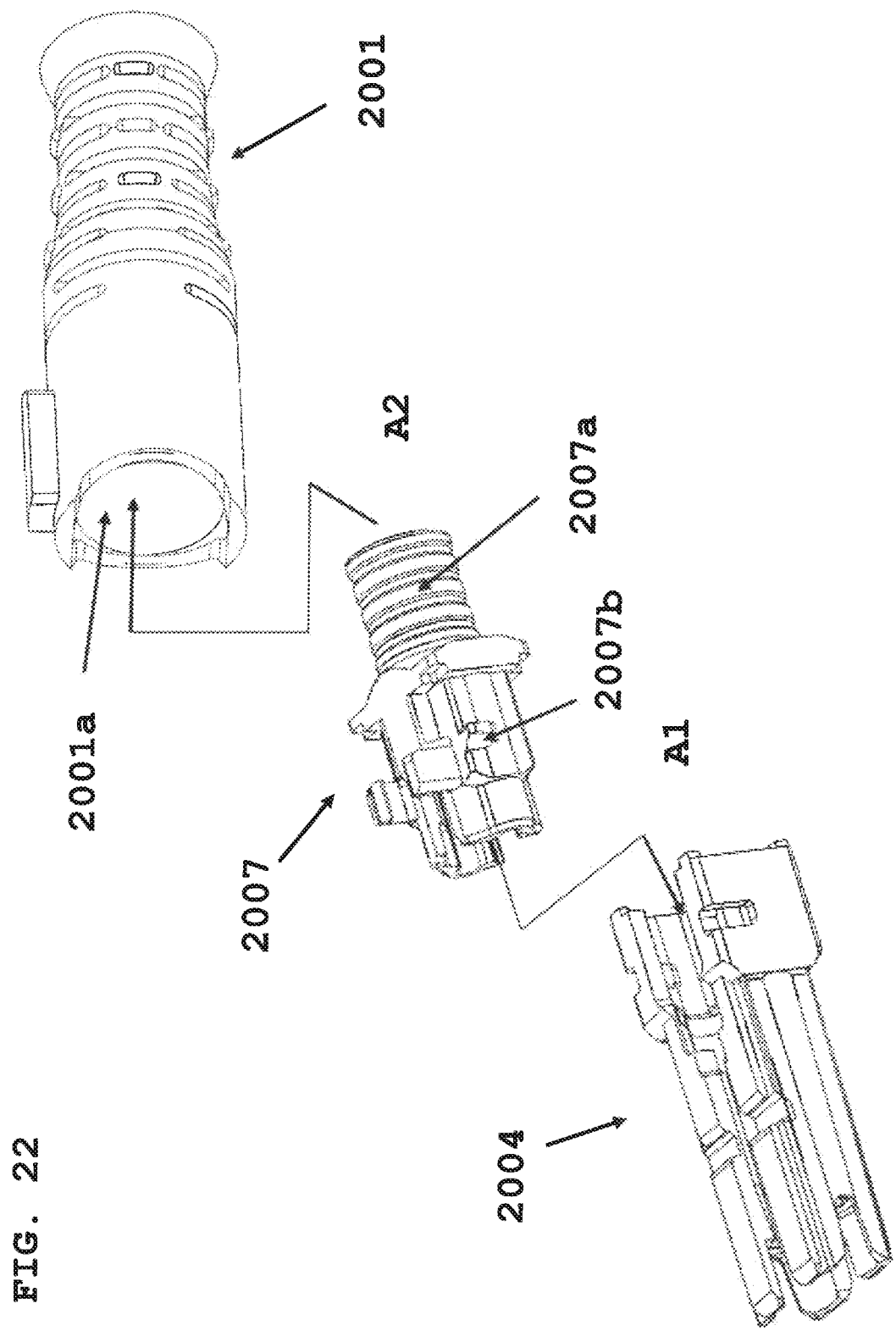
FIG. 22 depicts an exploded view showing assembly of fiber optic connector housing and backbody with the cable boot.

FIG. 21 depicts adapter release 2002 with opening 2002a configured to accept protrusion 2003 formed as part of cable boot 2001. When assembled, protrusion 2003 is retained within opening 2002a as shown by dotted arrow. FIG. 22 depicts assembling connector housing 2004 to backbody 2007 at step A1 via latches 2007b, and inserting ribbed flange 2007a of backbody 2007 into bore or opening 2001a of cable boot, thereby securing the cable boot to the connector body.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A push-pull boot connector configured to latch with an adapter port, the push-pull boot connector comprising:
   a connector housing having a distal end portion and an opposite proximal end portion spaced apart along a longitudinal axis,
   a backbody secured to the distal end portion of the connector housing,
   a cable boot configured to be disposed adjacent the backbody, the cable boot being displaceable relative to the connector housing and the backbody along the longitudinal axis; and
   an adapter release slidably connected to the connector housing and coupled to the cable boot such that the displacement of the cable boot relative to the connector housing and the backbody in a distal direction along the longitudinal axis can displace the adapter release relative to the connector housing and the backbody in the distal direction along the longitudinal axis, the adapter release including a release section configured to unlatch the connector and the adapter port as the adapter release is displaced relative to the connector housing and the backbody in the distal direction along the longitudinal axis;
   wherein the release has a distal end portion and a clip adjacent the distal end portion and wherein the cable boot comprises a recess, the clip being configured to clip onto the cable boot by engagement with the recess.

2. The push-pull boot connector as set forth in claim 1, wherein the clip comprises opposing first and second wings.

3. The push-pull boot connector as set forth in claim 1, wherein the clip is configured to be pushed onto a portion of the cable boot in a radial direction with respect to the longitudinal axis to clip onto the cable boot in the groove.

4. The push-pull boot connector as set forth in claim 1, wherein the connector housing comprises a channel extending generally along the longitudinal axis and the release comprises a tongue slidably received in the channel.

5. The push-pull boot connector as set forth in claim 4, wherein the tongue is located between the release section and the connector housing.

6. The push-pull boot connector as set forth in claim 1, wherein the connector housing comprises a duplex connector housing configured to plugged into an undivided duplex adapter port.

7. The push-pull boot connector as set forth in claim 6, further comprising first and second optical fiber ferrules received in the duplex connector housing, the duplex connector housing being configured to block the first and second optical fiber ferrules from passing into adjacent, divided simplex adapter ports.

8. The push-pull boot connector as set forth in claim 1, wherein the backbody and the cable boot comprise mutual latching features configured to retain the cable boot on the connector housing.

9. The push-pull boot connector as set forth in claim 8, wherein the mutual latching features allow the cable boot to have a limited range of motion along the longitudinal axis with respect to the back body.

10. The push-pull boot connector as set forth in claim 1, wherein connector housing has a length along the longitudinal axis from the distal end portion to the proximal end portion and the adapter release comprises an elongate arm above the connector housing along a majority of the length of the connector housing, the release section being part of the elongate arm.

11. A push-pull boot connector comprising:
    a connector housing having a distal end portion and an opposite proximal end portion spaced apart along a longitudinal axis,
    a backbody secured to the distal end portion of the connector housing, the backbody comprising an elongate slot having a proximal end and a distal end,
    a cable boot connected to the backbody for movement relative to the backbody along the longitudinal axis in a limited range of motion, the cable boot having a proximal end portion and a distal end portion, the cable boot comprising a protrusion adjacent the proximal end portion, the protrusion being slidably received in the slot and being configured to engage the back body at the proximal end of the slot and at the distal end of the slot such that the proximal and distal ends of the slot respectively define opposite proximal and distal ends of the limited range of motion.

12. The push-pull boot connector as set forth in claim 11, further comprising an adapter release slidably connected to the connector housing.

13. The push-pull boot connector as set forth in claim 12, wherein the adapter release is coupled to the cable boot such that the cable boot displaces the adapter release in a distal direction when the cable boot moves along the limited range of motion from the proximal end of the limited range of motion to the distal end of the limited range of motion.

14. The push-pull boot connector as set forth in claim 13, wherein the push-pull boot connector is configured to latch with an adapter port and the adapter release is configured to unlatch the push-pull boot connector from the adapter port when the cable boot displaces the adapter release in the distal direction.

15. The push-pull boot connector as set forth in claim 14, wherein the adapter release has an opening and the cable boot comprises an outward protrusion, the opening being configured to accept the outward protrusion of the cable boot.

16. The push-pull boot connector as set forth in claim 14, wherein the release has a distal end portion and a clip adjacent the distal end portion and wherein the cable boot comprises a recess, the clip being configured to clip onto the cable boot by engagement with the recess.

17. The push-pull boot connector as set forth in claim 14, wherein the connector housing comprises a channel extending generally along the longitudinal axis and the release comprises a tongue slidably received in the channel.

18. The push-pull boot connector as set forth in claim 17, wherein the adapter release comprises a release section configured to unlatch the push-pull boot connector from the adapter port, the tongue being located between the release section and the connector housing.

19. The push-pull boot connector as set forth in claim 14, wherein connector housing has a length along the longitudinal axis from the distal end portion to the proximal end portion and the adapter release comprises an elongate arm above the connector housing along a majority of the length of the connector housing.

20. The push-pull boot connector as set forth in claim 11, wherein the connector housing comprises a duplex connector housing configured to plugged into an undivided duplex adapter port.

21. The push-pull boot connector as set forth in claim 20, further comprising first and second optical fiber ferrules received in the duplex connector housing, the duplex connector housing being configured to block the first and second optical fiber ferrules from passing into adjacent, divided simplex adapter ports.

22. The push-pull boot connector as set forth in claim 11, wherein the backbody further comprises a back post, the elongate slot being spaced apart from the back post along the longitudinal axis in a proximal direction.

23. The push-pull boot connector as set forth in claim 22, wherein the elongate slot comprises a plurality of elongate slots at circumferentially spaced apart locations about the longitudinal axis.

24. The push-pull boot connector as set forth in claim 23, wherein the protrusion comprises a plurality of protrusions at circumferentially spaced apart locations about the longitudinal axis.

25. The push-pull boot connector as set forth in claim 24, wherein each of the plurality of protrusions is slidably received in a respective one of the plurality of slots.

26. The push-pull boot connector as set forth in claim 11, wherein the cable boot is configured to couple to the backbody by being pushed onto the backbody in a proximal direction along the longitudinal axis.

27. The push-pull boot connector as set forth in claim 26, wherein the protrusion is configured to snap into the elongate slot as the protrusion crosses the distal end of the elongate slot while being pushed onto the backbody in the proximal direction.

* * * * *